(12) United States Patent
Hannuksela et al.

(10) Patent No.: US 12,074,934 B2
(45) Date of Patent: Aug. 27, 2024

(54) METHOD AND APPARATUS FOR GROUPING ENTITIES IN MEDIA CONTENT

(71) Applicant: Nokia Technologies Oy, Espoo (FI)

(72) Inventors: Miska Hannuksela, Tampere (FI); Sujeet Shyamsundar Mate, Tampere (FI); Emre Aksu, Tampere (FI); Kashyap Kammachi Sreedhar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/433,387

(22) PCT Filed: Feb. 21, 2020

(86) PCT No.: PCT/FI2020/050113
§ 371 (c)(1),
(2) Date: Aug. 24, 2021

(87) PCT Pub. No.: WO2020/188142
PCT Pub. Date: Sep. 24, 2020

(65) Prior Publication Data
US 2022/0150296 A1    May 12, 2022

Related U.S. Application Data

(60) Provisional application No. 62/819,228, filed on Mar. 15, 2019.

(51) Int. Cl.
*H04L 65/75* (2022.01)
(52) U.S. Cl.
CPC .................. *H04L 65/75* (2022.05)
(58) Field of Classification Search
CPC .. H04L 65/601; H04N 13/315; H04N 13/178; H04N 13/398; H04N 19/146;
(Continued)

(56) References Cited

U.S. PATENT DOCUMENTS

| 2012/0269256 A1 | 10/2012 | Ki et al. |
| 2016/0232939 A1 | 8/2016 | Malamal Vadakital et al. |

(Continued)

FOREIGN PATENT DOCUMENTS

| CN | 101802823 A | 8/2010 |
| CN | 107251521 A | 10/2017 |

(Continued)

OTHER PUBLICATIONS

"Information Technology—Coding of Audio-Visual Objects—Part 12: ISO Base Media File Format", ISO/IEC 14496-12, Fifth edition, Dec. 15, 2015, 248 pages.

(Continued)

*Primary Examiner* — Tan Doan

(74) *Attorney, Agent, or Firm* — Harrington & Smith

(57) ABSTRACT

A method, apparatus and computer program product create a media presentation description with a first representation set and a second representation set. The first representation set belongs to a first adaptation set and the second representation set belongs to a second adaptation set and the first representation set is associated with the first media entity and the second representation set is associated with the second media entity. The method, apparatus and computer program product encode, in the media presentation description, an adaptation and representation grouping descriptor. The adaptation and representation grouping descriptor groups the first representation set with the second representation set based on the grouping type.

19 Claims, 4 Drawing Sheets

(58) Field of Classification Search
CPC .... H04N 19/154; H04N 19/167; H04N 19/33; H04N 19/46; H04N 19/59; H04N 19/597; H04N 13/161; H04N 19/114; H04N 19/187; H04N 19/172; H04N 19/423; H04N 19/513

USPC .......................................................... 709/217

See application file for complete search history.

(56) References Cited

U.S. PATENT DOCUMENTS

| | | | |
|---|---|---|---|
| 2017/0053675 A1* | 2/2017 | Dickerson | G11B 27/34 |
| 2017/0223083 A1 | 8/2017 | Maze et al. | |
| 2017/0347026 A1 | 11/2017 | Hannukela | |
| 2019/0104316 A1* | 4/2019 | Da Silva Pratas Gabriel | G06F 16/78 |
| 2020/0014906 A1* | 1/2020 | Wang | G06V 20/46 |

FOREIGN PATENT DOCUMENTS

| | | |
|---|---|---|
| CN | 107409234 A | 11/2017 |
| CN | 107431819 A | 12/2017 |
| CN | 107534801 A | 1/2018 |
| CN | 108322775 A | 7/2018 |
| WO | WO-2019/009319 A1 | 1/2019 |

OTHER PUBLICATIONS

"Information Technology—Coding of Audio-Visual Objects—Part 14: MP4 File Format", ISO/IEC 14496-14, First edition, Nov. 15, 2003, 18 pages.

"Information Technology—Coding of Audio-Visual Objects—Part 15: Advanced Video Coding (AVC) File Format", ISO/IEC 14496-15, First edition, Apr. 15, 2004, 29 pages.

"High Efficiency Video Coding", Series H: Audiovisual And Multimedia Systems, Infrastructure of audiovisual services—Coding of moving video, Recommendation ITU-T H.265, Feb. 2018, 692 pages.

"Information technology—Coded representation of immersive media (MPEG-I)—Part 2: Omnidirectional media format", ISO/IEC JTC 1/SC 29/WG 11, ISO/IEC FDIS 23090-2:201x (E), Apr. 26, 2018, 182 pages.

"3rd Generation Partnership Project; Technical Specification Group Services and System Aspects; Transparent end-to-end Packet-switched Streaming Service (PSS); Protocols and codecs (Release 15)", 3GPP TS 26.234, V15.1.0, Sep. 2018, pp. 1-174.

"Information Technology—Dynamic Adaptive Streaming over HTTP (DASH)—Part 1: Media Presentation Description and Segment Formats", ISO/IEC 23009-1, Second Edition, May 15, 2014, 152 pages.

Moats, "URN Syntax", RFC 2141, Network Working Group, May 1997, pp. 1-8.

Lee et al., "Uniform Resource Identifier (URI): Generic Syntax", RFC 3986, Network Working Group, Jan. 2005, pp. 1-61.

"Advanced Video Coding for Generic Audiovisual services", Series H: Audiovisual and Multimedia Systems, Infrastructure of audiovisual services—Coding of moving Video, Recommendation ITU-T H.264, Apr. 2017, 812 pages.

"Versatile Video Coding", Series H: Audiovisual and Multimedia Systems Infrastructure of audiovisual services—Coding of moving video, Recommendation ITU-T H.266, Aug. 2020, 516 pages.

"3rd Generation Partnership Project; Technical Specification Group Services and System Aspects; Transparent end-to-end packet switched streaming service (PSS); 3GPP file format (3GP) (Release 15)", 3GPP TS 26.244, V15.0.0, Jun. 2018, pp. 1-67.

International Search Report and Written Opinion received for corresponding Patent Cooperation Treaty Application No. PCT/FI2020/050113, dated Jun. 8, 2020, 13 pages.

Wang et al., "WD 4 of ISO/IEC 23090-2 OMAF 2nd edition", Systems, ISO/IEC JTC1/SC29/WG11 N18227-v1, Jan. 2019, 227 pages.

Aksu et al., "[HEIF] Logical Grouping of Entities", Nokia, ISO/IEC JTC1/SC29/WG11 MPEG2019/M46034, Jan. 2019, 3 pages.

Sreedhar et al., "[OMAF] DASH signaling for overlay grouping in OMAF", Nokia, ISO/IEC JTC1/SC29/WG11 MPEG2019/M47253, Mar. 2019, 3 pages.

Office action received for corresponding Indian Patent Application No. 202147046407, dated Apr. 25, 2022, 6 pages.

Zhu, Xiao-Chen and Shen, Su-Bin "Survey of Dynamic Adaptive Streaming over HTTP (DASH)" Journal of System Simulation vol. 25, No. 11. Nov. 2013.

\* cited by examiner

METHOD AND APPARATUS FOR GROUPING ENTITIES IN MEDIA CONTENT

RELATED APPLICATION

This application claims priority to PCT Application No. PCT/FI2020/050113, filed on Feb. 21, 2020, which claims priority to U.S. Application No. 62/819,228, filed on Mar. 15, 2019, each of which is incorporated herein by reference in its entirety.

TECHNOLOGICAL FIELD

Some embodiments relates generally to a method, apparatus and computer program product for grouping of entities in media content.

BACKGROUND

Virtual reality audiovisual content, such as 360° video and other similar content, has become increasingly popular amongst viewers and content creators who prefer or otherwise enjoy the immersive viewing experience available from such content. This increase in the popularity of virtual reality content has driven viewer demand for streaming virtual reality content that provides a high-quality viewing experience.

The consumption of immersive multimedia, such as omnidirectional content consumption for virtual reality and other applications, is more complex for a client then the consumption of two-dimensional content. This increased complexity is attributable to the higher degrees of freedom available to the client when consuming immersive multimedia. Although enhancing the user experience, the higher degrees of freedom result in increased uncertainty.

The omnidirectional media application format (OMAF) version 1 (v1) standard defines omnidirectional streaming of content having three degrees of freedom. OMAF defines formats for enabling the access and delivery of omnidirectional media. The media components are distributed (example multiple resolutions, bitrate/quality) among different bitstreams to provide the application, the freedom to choose between them for addressing various system challenges such as network bandwidth, temporal and spatial random access for user interaction.

BRIEF SUMMARY

A method, apparatus and computer program product are provided in accordance with some embodiments in order to facilitate grouping of entities in media content.

In one example embodiment, a method is provided that includes creating a media presentation description with a first representation set and a second representation set. The first representation set belongs to a first adaptation set and the second representation set belongs to a second adaptation set and the first representation set is associated with the first media entity and the second representation set is associated with the second media entity. The method further includes encoding, in the media presentation description, an adaptation and representation grouping descriptor. The adaptation and representation grouping descriptor groups the first representation set with the second representation set based on the grouping type.

In some implementations of such a method, the method further includes encoding a first media entity and a second media entity in a container file. In some embodiments, the method further includes encoding a first entity grouping based on a grouping type in the container file. The first entity grouping groups the first media entity and the second media entity based on a characteristic defined by the grouping type. In some embodiments, the method further includes causing storage of the container file. In some embodiments, the adaptation and representation grouping descriptor is present at a period level. In some embodiments, the adaptation and representation grouping descriptor is present at a media presentation description level.

In another example embodiment, a method is provided that includes parsing, from a media presentation description of a container file, a first representation set belonging to a first adaptation set of the container file and a second representation set belonging to a second adaptation set of the container file. The method further includes parsing, from the media presentation description, an adaptation and representation grouping descriptor. The adaptation and representation grouping descriptor groups the first representation set with the second representation set based on the grouping type. The method further includes selecting the first representation set and the second representation set. The method further includes causing the first representation set and the second representation set to be played based on the first entity grouping or the adaptation and representation grouping descriptor.

In another example embodiment, an apparatus is provided that includes processing circuitry and at least one memory including computer program code for one or more programs with the at least one memory and the computer program code configured to, with the processing circuitry, cause the apparatus at least to create a media presentation description with a first representation set and a second representation set. The first representation set belongs to a first adaptation set and the second representation set belongs to a second adaptation set and the first representation set is associated with the first media entity and the second representation set is associated with the second media entity. The computer program code is further configured to, with the at least one processor, cause the apparatus to encode, in the media presentation description, an adaptation and representation grouping descriptor. The adaptation and representation grouping descriptor groups the first representation set with the second representation set based on the grouping type.

In some implementations of such an apparatus, the computer program code is further configured to, with the at least one processor, cause the apparatus to encode a first media entity and a second media entity in a container file. In some embodiments, the computer program code is further configured to, with the at least one processor, cause the apparatus to encode a first entity grouping based on a grouping type in the container file. The first entity grouping groups the first media entity and the second media entity based on a characteristic defined by the grouping type. In some embodiments, the computer program code is further configured to with the at least one processor, cause the apparatus to cause storage of the container file. In some embodiments, the adaptation and representation grouping descriptor is present at a period level. In some embodiments, the adaptation and representation grouping descriptor is present at a media presentation description level.

In another example embodiment, an apparatus is provided that includes processing circuitry and at least one memory including computer program code for one or more programs with the at least one memory and the computer program code configured to, with the processing circuitry, cause the apparatus at least to parse, from a media presentation description of a container file, a first representation set belonging to a first adaptation set of the container file and a second representation set belonging to a second adaptation set of the container file. The computer program code is further configured to, with the at least one processor, cause the apparatus to parse, from the media presentation description, an adaptation and representation grouping descriptor. The adaptation and representation grouping descriptor groups the first representation set with the second representation set based on the grouping type. The computer program code is further configured to, with the at least one processor, cause the apparatus to select the first representation set and the second representation set. The computer program code is further configured to, with the at least one processor, cause the apparatus to cause the first n/representation set and the second representation set to be played based on the first entity gbbbn/rouping or the adaptation and representation grouping descriptor.

In another example embodiment, an apparatus is provided that includes means for creating a media presentation description with a first representation set and a second representation set. The first representation set belongs to a first adaptation set and the second representation set belongs to a second adaptation set and the first representation set is associated with the first media entity and the second representation set is associated with the second media entity. The apparatus further includes means for encoding, in the media presentation description, an adaptation and representation grouping descriptor. The adaptation and representation grouping descriptor groups the first representation set with the second representation set based on the grouping type.

In some implementations of such an apparatus, the apparatus further includes means for encoding a first media entity and a second media entity in a container file. In some embodiments, the apparatus further includes means for encoding a first entity grouping based on a grouping type in the container file. The first entity grouping groups the first media entity and the second media entity based on a characteristic defined by the grouping type. In some embodiments, the apparatus further includes means for causing storage of the container file. In some embodiments, the adaptation and representation grouping descriptor is present at a period level. In some embodiments, the adaptation and representation grouping descriptor is present at a media presentation description level.

In another example embodiment, an apparatus is provided that includes means for parsing, from a media presentation description of a container file, a first representation set belonging to a first adaptation set of the container file and a second representation set belonging to a second adaptation set of the container file. The apparatus further includes means for parsing, from the media presentation description, an adaptation and representation grouping descriptor. The adaptation and representation grouping descriptor groups the first representation set with the second representation set based on the grouping type. The apparatus further includes means for selecting the first representation set and the second representation set. The apparatus further includes means for causing the first representation set and the second representation set to be played based on the first entity grouping or the adaptation and representation grouping descriptor.

In another example embodiment, a computer program product is provided that includes at least one non-transitory computer-readable storage medium having computer executable program code instructions stored therein with the computer executable program code instructions comprising program code instructions configured, upon execution, to create a media presentation description with a first representation set and a second representation set. The first representation set belongs to a first adaptation set and the second representation set belongs to a second adaptation set and the first representation set is associated with the first media entity and the second representation set is associated with the second media entity. The computer executable program code instructions comprise program code instructions are further configured, upon execution, to encode, in the media presentation description, an adaptation and representation grouping descriptor. The adaptation and representation grouping descriptor groups the first representation set with the second representation set based on the grouping type.

In some implementations of such a computer program product, the computer executable program code instructions comprise program code instructions are further configured, upon execution, to encode a first media entity and a second media entity in a container file. In some embodiments, the computer executable program code instructions comprise program code instructions are further configured, upon execution, encode a first entity grouping based on a grouping type in the container file. The first entity grouping groups the first media entity and the second media entity based on a characteristic defined by the grouping type. In some embodiments, the computer executable program code instructions comprise program code instructions are further configured, upon execution, to cause storage of the container file. In some embodiments, the apparatus further includes means for causing storage of the container file. In some embodiments, the adaptation and representation grouping descriptor is present at a period level. In some embodiments, the adaptation and representation grouping descriptor is present at a media presentation description level.

In another example embodiment, a computer program product is provided that includes at least one non-transitory computer-readable storage medium having computer executable program code instructions stored therein with the computer executable program code instructions comprising program code instructions configured, upon execution, to parse, from a media presentation description of a container file, a first representation set belonging to a first adaptation set of the container file and a second representation set belonging to a second adaptation set of the container file. The computer executable program code instructions comprise program code instructions are further configured, upon execution, to parse, from the media presentation description, an adaptation and representation grouping descriptor. The adaptation and representation grouping descriptor groups the first representation set with the second representation set based on the grouping type. The computer executable program code instructions comprise program code instructions are further configured, upon execution, to select the first representation set and the second representation set. The computer executable program code instructions comprise program code instructions are further configured, upon execution, to cause the first representation set and the second representation set to be played based on the first entity grouping or the adaptation and representation grouping descriptor.

BRIEF DESCRIPTION OF THE DRAWINGS

Figure 1B:
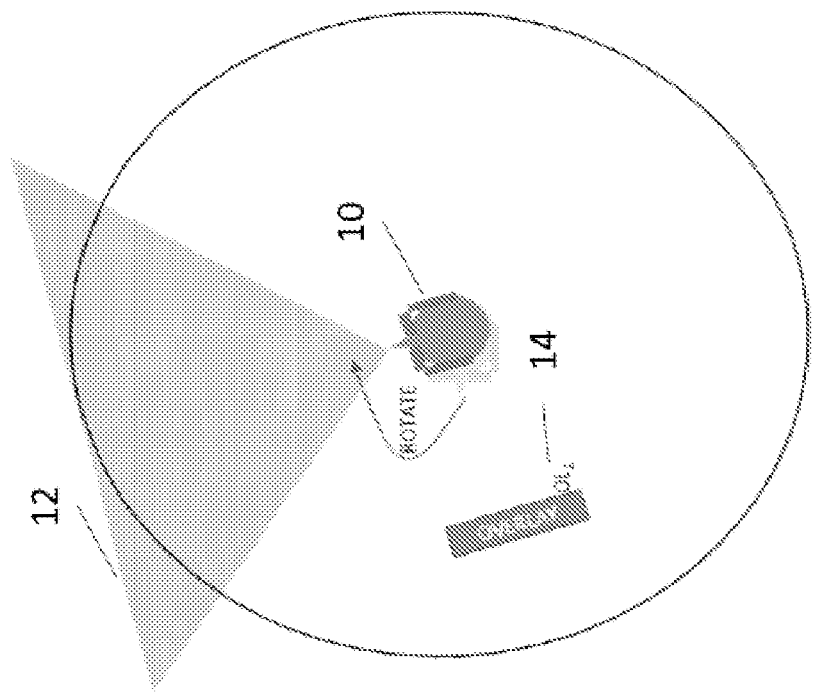
Figure 1A:
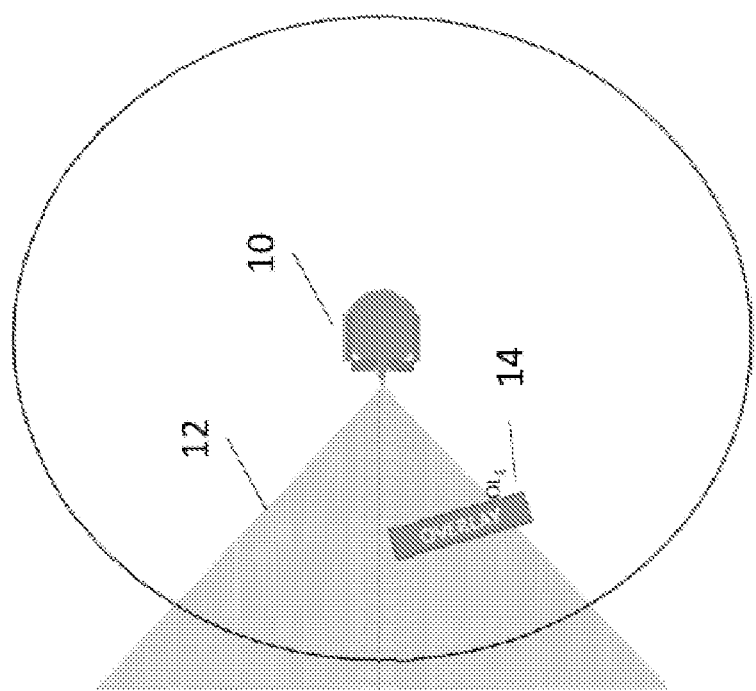
Figure 2:
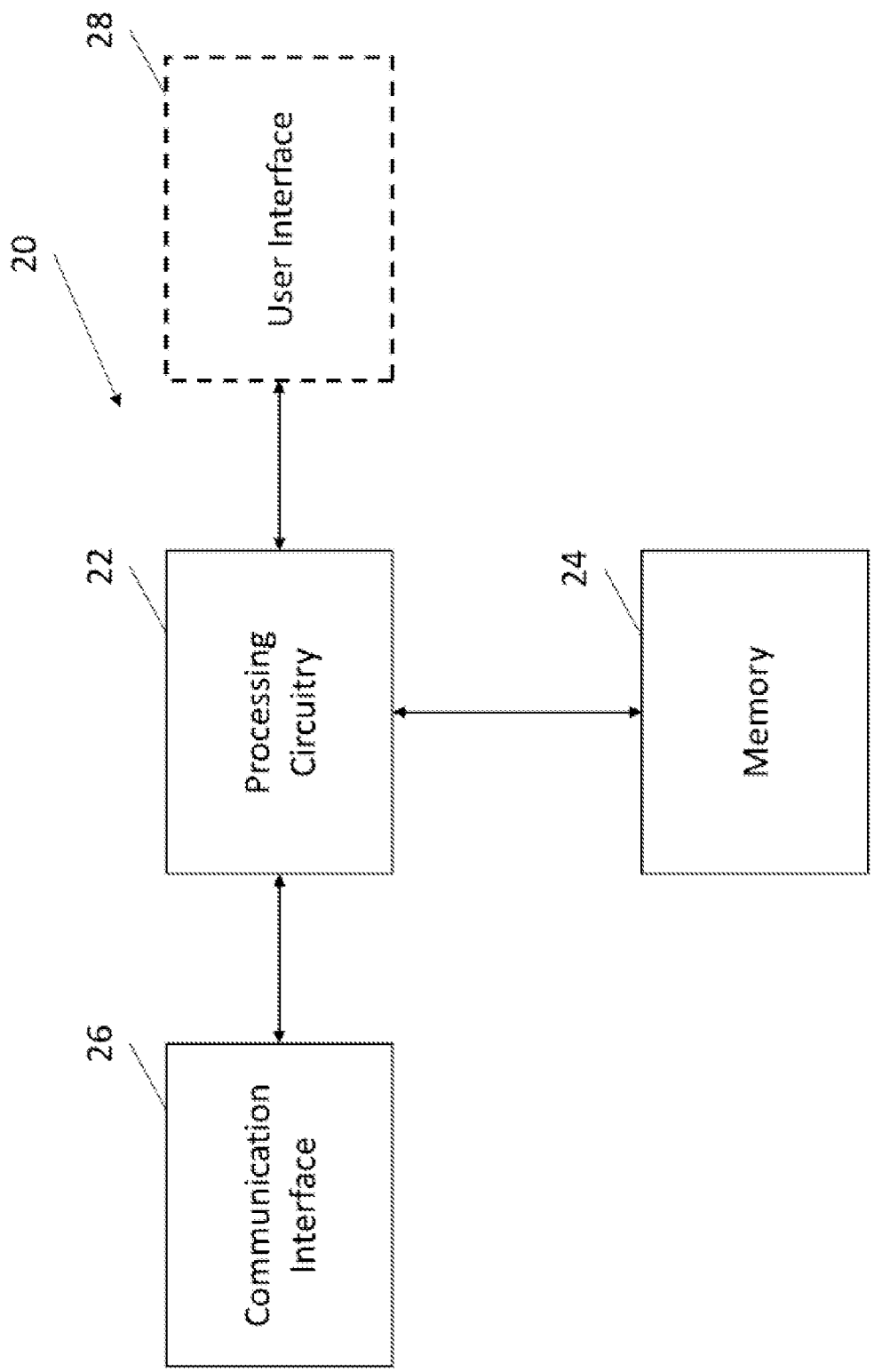
Figure 3:
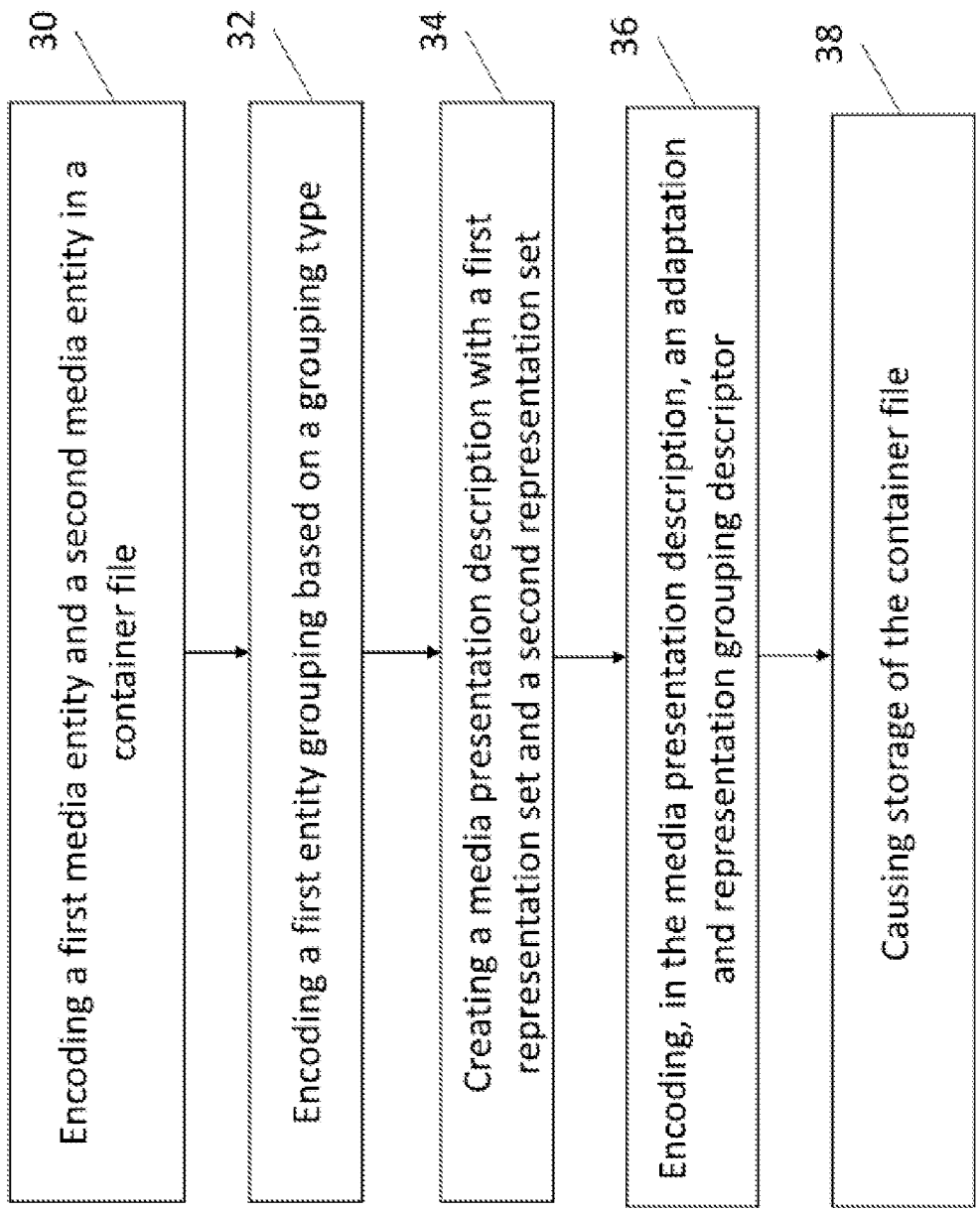
Figure 4:
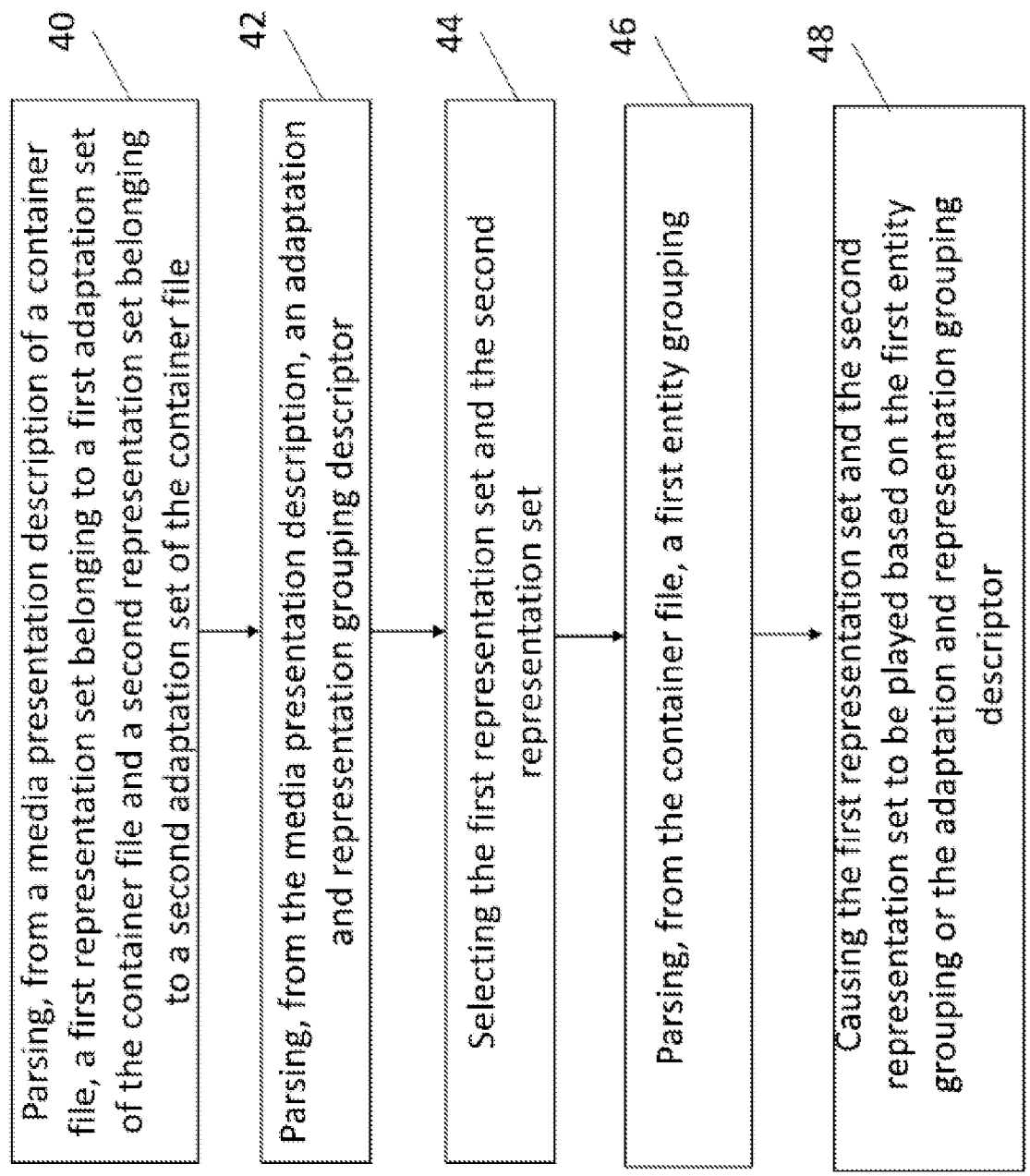

Having thus described certain example embodiments of the present disclosure in general terms, reference will here- inafter be made to the accompanying drawings, which are not necessarily drawn to scale, and wherein:

FIGS. 1A and 1B are graphical representations of an instance where a user's field of view rotates during omnidirectional media content playback referenced in connection with describing some of the example embodiments contained herein;

FIG. 2 is a block diagram of an apparatus that may be specifically configured in accordance with an example embodiment of the present invention;

FIG. 3 is a flowchart illustrating a set of operations performed, such as by the apparatus of FIG. 2, in accordance with an example embodiment of the present invention; and FIG. 4 is a flowchart illustrating a set of operations performed, such as by the apparatus of FIG. 2, in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

As used herein the term "omnidirectional content" refers to media content that has greater spatial extent than a field-of-view of a device rendering the content. Omnidirectional content may for example cover substantially 360 degrees in the horizontal dimension and substantially 180 degrees in the vertical dimension, but omnidirectional may also refer to content covering less than 360 degree view in the horizontal direction and/or 180 degree view in the vertical direction.

As used herein the term "observation point or Viewpoint" refers to a volume in a three-dimensional space for virtual reality audio/video acquisition or playback. A Viewpoint is a trajectory, such as a circle, a region, or a volume, around the center point of a device or rig used for omnidirectional audio/video acquisition and the position of the observer's head in the three-dimensional space in which the audio and video tracks are located. In some cases, an observer's head position is tracked and the rendering is adjusted for head movements in addition to head rotations, and then a Viewpoint may be understood to be an initial or reference position of the observer's head. In implementations utilizing DASH (Dynamic adaptive streaming over HTTP), each observation point may be defined as a viewpoint by a viewpoint property descriptor. The definition may be stored in the ISOBMFF (International Standards Organization (ISO) base media file format (ISO/IEC 14496-12)) or OMAF type of file format. The delivery could be HLS (HTTP Live Streaming), RTSP/RTP (Real Time Streaming Protocol/Real-time Transport Protocol) streaming in addition to DASH.

As used herein, the term "Viewpoint group" refers to one or more Viewpoints that are either spatially related or logically related. The Viewpoints in a Viewpoint group may be defined based on relative positions defined for each Viewpoint with respect to a designated origin point of the group. Each Viewpoint group may also include a default Viewpoint that reflects a default playback starting point when a user starts to consume audio-visual content in the Viewpoint group, without choosing a Viewpoint, for playback. The default Viewpoint may be the same as the designated origin point. In some embodiments, one Viewpoint may be included in multiple Viewpoint groups.

As used herein, the term "spatially related Viewpoint group" refers to Viewpoints which have content that has a spatial relationship between them. For example, content captured by VR cameras at different locations in the same basketball court or a music concert captured from different locations on the stage.

As used herein, the term "logically related Viewpoint group" refers to related Viewpoints which do not have a clear spatial relationship, but are logically related. The relative position of logically related Viewpoints are described based on the creative intent. For example, two Viewpoints that are members of a logically related Viewpoint group may correspond to content from the performance area and the dressing room. Another example could be two Viewpoints from the dressing rooms of the two competing teams that form a logically related Viewpoint group to permit users to traverse between both teams to see the player reactions.

As used herein, the term "static Viewpoint" refers to a Viewpoint that remains stationary during one virtual reality audio/video acquisition and playback session. For example, a static Viewpoint may correspond with virtual reality audio/video acquisition performed by a fixed camera.

As used herein, the term "dynamic Viewpoint" refers to a Viewpoint that does not remain stationary during one virtual reality audio/video acquisition and playback session. For example, a dynamic Viewpoint may correspond with virtual reality audio/video acquisition performed by a moving camera on rails or a moving camera on a flying drone.

As used herein, the term "viewing setup" refers to a setup of one or more Viewpoints and viewing orientations. In the context of a presentation that has only one Viewpoint available, the Viewpoint need not be explicitly indicated or concluded for a viewing setup. If a presentation has multiple Viewpoints available, the Viewpoints will be setup based on one or more Viewpoint groups, and the spatial or logical relationship between Viewpoints in each Viewpoint group will be indicated in the viewing setup.

A method, apparatus and computer program product are provided in accordance with some embodiments in order to facilitate grouping of entities in media content. The method, apparatus and computer program product may be utilized in conjunction with a variety of video formats including High Efficiency Video Coding standard (HEVC or H.265/HEVC), Advanced Video Coding standard (AVC or H.264/AVC), the upcoming Versatile Video Coding standard (VVC or H.266/VVC), and/or with a variety of video and multimedia file formats including International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), file formats for NAL (Network Abstraction Layer) unit structured video (ISO/IEC 14496-15) and $3^{rd}$ Generation Partnership Project (3GPP file format) (3GPP Technical Specification 26.244, also known as the 3GP format). ISOBMFF is the base for derivation of all the above mentioned file formats.

Some aspects of the disclosure relate to container file formats, such as International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), file formats for NAL (Network Abstraction Layer) unit structured video (ISO/IEC 14496-15) and $3^{rd}$ Generation Partnership Project (3GPP file format) (3GPP Technical Specification 26.244, also known as the 3GP format). An example embodiment is described in conjunction with the ISOBMFF or its derivatives, however, the present disclosure is not limited to ISOBMFF, but rather the description is given for one possible basis on top of which some embodiments of the present disclosure may be partly or fully realized.

A basic building block in the ISO base media file format is called a box. Each box has a header and a payload. The box header indicates the type of the box and the size of the box in terms of bytes. Box type is typically identified by an unsigned 32-bit integer, interpreted as a four character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g. VisualSampleEntry, AudioSampleEntry). Which type of sample entry form is used for derivation of the track-type specific sample entry format is determined by the media handler of the track.

The track reference mechanism can be used to associate tracks with each other. The TrackReferenceBox includes box(es), each of which provides a reference from the containing track to a set of other tracks. These references are labeled through the box type (e.g., the four-character code of the box) of the contained box(es).

The ISO Base Media File Format contains three mechanisms for timed metadata that can be associated with particular samples: sample groups, timed metadata tracks, and sample auxiliary information. A derived specification may provide similar functionality with one or more of these three mechanisms.

A sample grouping in the ISO base media file format and its derivatives, such as the advanced video coding (AVC) file format and the scalable video coding (SVC) file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

In ISOMBFF, an edit list provides a mapping between the presentation timeline and the media timeline. Among other things, an edit list provides for the linear offset of the presentation of samples in a track, provides for the indication of empty times and provides for a particular sample to be dwelled on for a certain period of time. The presentation timeline may be accordingly modified to provide for looping, such as for the looping videos of the various regions of the scene. One example of the box that includes the edit list, the EditListBox, is provided below:

```
aligned(8) class EditListBox extends FullBox('elst', version, flags) {
unsigned int(32) entry_count;
    for (i=1; i <= entry_count; i++) {
        if (version==1) {
            unsigned int(64) segment_duration;
            int(64) media_time;
        } else { // version==0
            unsigned int(32) segment_duration;
            int(32) media_time;
        }
        int(16) media_rate_integer;
        int(16) media_rate_fraction = 0;
    }
}
```

In ISOBMFF, an EditListBox may be contained in EditBox, which is contained in TrackBox ('trak').

In this example of the edit list box, flags specify the repetition of the edit list. By way of example, setting a specific bit within the box flags (the least significant bit, e.g., flags & 1 in ANSI-C notation, where & indicates a bit-wise AND operation) equal to 0 specifies that the edit list is not repeated, while setting the specific bit (e.g., flags & 1 in ANSI-C notation) equal to 1 specifies that the edit list is repeated. The values of box flags greater than 1 may be defined to be reserved for future extensions. As such, when the edit list box indicates the playback of zero or one samples, (flags & 1) may be equal to zero. When the edit list is repeated, the media at time 0 resulting from the edit list follows immediately the media having the largest time resulting from the edit list such that the edit list is repeated seamlessly.

In ISOBMFF, a Track group enables grouping of tracks based on certain characteristics or the tracks within a group having a particular relationship. Track grouping, however, does not allow any image items in the group.

The syntax of TrackGroupBox in ISOBMFF is as follows:

```
aligned(8) class TrackGroupBox extends Box('trgr') {
}
aligned(8) class TrackGroupTypeBox(unsigned int(32) track_group_type)
extends
FullBox(track_group_type, version = 0, flags = 0)
{
    unsigned int(32) track_group_id;
    // the remaining data may be specified for a particular track_group_type
}
``` track_group_type indicates the grouping_type and may be set to one of the following values, or a value registered, or a value from a derived specification or registration: 'msrc' indicates that this track belongs to a multi-source presentation (which may be referred as a characteristic). The tracks that have the same value of track_group_id within a TrackGroupTypeBox of track_group_type 'msrc' are mapped as being originated from the same source. For example, a recording of a video telephony call may have both audio and video for both participants, and the value of track_group_id associated with the audio track and the video track of one participant differs from value of track_group_id associated with the tracks of the other participant. The pair of track_group_id and track_group_type identifies a track group within the file. The tracks that contain a particular TrackGroupTypeBox having the same value of track_group_id and track_group_type belong to the same track group.

The Entity grouping is similar to track grouping but enables grouping of both tracks and items (e.g. image items) in the same group.

The Entity grouping is similar to track grouping but enables grouping of both tracks and image items in the same group. The syntax of EntityToGroupBox in ISOBMFF may be as follows:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
}
``` group_id is a non-negative integer assigned to the particular grouping that may not be equal to any group_id value of any other EntityToGroupBox, any item_ID value of the hierarchy level (file, movie. or track) that contains the GroupsListBox, or any track_ID value (when the GroupsListBox is contained in the file level). num_entities_in_group specifies the number of entity_id values mapped to this entity group. entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a HandlerBox ('hdlr') box indicating the structure or format of the 'meta' box contents. The meta box may list and characterize any number of items that can be referred and each one of them can be associated with a file name and are uniquely identified with the filef by item identifier (item_id) which is an integer value. The metadata items may be for example stored in the Item Data Box ('idat') box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents. The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises still images that are stored as items and image sequences that are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others then this item is signaled by the Primary Item ('pitm') box. Apart from the boxes mentioned here, the 'meta' box is also flexible to include other boxes that may be necessary to describe items.

Any number of image items can be included in the same file. Given a collection of images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

A panoramic image covering a 360-degree field-of-view horizontally and a 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. In some cases panoramic content with a 360-degree horizontal field-of-view but with less than a 180-degree vertical field-of-view may be considered special cases of equirectangular projection, where the polar areas of the sphere have not been mapped onto the two-dimensional image plane. In some cases panoramic content may have less than a 360-degree horizontal field-of-view and up to a 180-degree vertical field-of-view, while otherwise having the characteristics of an equirectangular projection format.

In cube map projection format, spherical video is projected onto the six faces (a.k.a. sides) of a cube. The cube map may be generated e.g. by first rendering the spherical scene six times from a viewpoint, with the views defined by a 90 degree view frustum representing each cube face. The cube sides may be frame-packed into the same frame or each cube side may be treated individually (e.g., in encoding). There are many possible orders of locating cube sides onto a frame and/or cube sides may be rotated or mirrored. The frame width and height for frame-packing may be selected to fit the cube sides "tightly" e.g. at 3×2 cube side grid, or may include unused constituent frames e.g. at 4×3 cube side grid.

In general, 360-degree content can be mapped onto different types of solid geometrical structures, such as a polyhedron (that is, a three-dimensional solid object containing flat polygonal faces, straight edges and sharp corners or vertices, e.g., a cube or a pyramid), a cylinder (by projecting a spherical image onto the cylinder, as described above with the equirectangular projection), a cylinder (directly without projecting onto a sphere first), a cone, etc. and then unwrapped to a two-dimensional image plane. The two-dimensional image plane can also be regarded as a geometrical structure. In other words, 360-degree content can be mapped onto a first geometrical structure and further unfolded to a second geometrical structure. However, it may be possible to directly obtain the transformation to the second geometrical structure from the original 360-degree content or from other wide view visual content. In general, an omnidirectional projection format may be defined as a format to represent (up to) 360-degree content on a two-dimensional image plane. Examples of omnidirectional projection formats include the equirectangular projection format and the cubemap projection format.

A viewport may be defined as a region of omnidirectional image or video suitable for display and viewing by the user. A current viewport (which may be sometimes referred simply as a viewport) may be defined as the part of the spherical video that is currently displayed and hence is viewable by the user(s). At any point of time, a video rendered by an application on a head-mounted display (HMD) renders a portion of the 360-degrees video, which is referred to as a viewport. Likewise, when viewing a spatial part of the 360-degree content on a conventional display, the spatial part that is currently displayed is a viewport. A viewport is a window on the 360-degree world represented in the omnidirectional video displayed via a rendering display. A viewport may be characterized by a horizontal field-of-view (VHFoV) and a vertical field-of-view (VVFoV). In the following, the horizontal field-of-view of the viewport will be abbreviated with HFoV and, respectively, the vertical field-of-view of the viewport will be abbreviated with VFoV.

A sphere region may be defined as a region on a sphere that may be specified by four great circles or by two azimuth circles and two elevation circles and additionally by a tile angle indicating rotation along the axis originating from the sphere origin passing through the center point of the sphere region. A great circle may be defined as an intersection of the sphere and a plane that passes through the center point of the sphere. A great circle is also known as an orthodrome or Riemannian circle. An azimuth circle may be defined as a circle on the sphere connecting all points with the same azimuth value. An elevation circle may be defined as a circle on the sphere connecting all points with the same elevation value.

The Omnidirectional Media Format ("OMAF") standard (ISO/IEC 23090-2) specifies a generic timed metadata syntax for sphere regions. A purpose for the timed metadata track is indicated by the track sample entry type. The sample format of all metadata tracks for sphere regions specified starts with a common part and may be followed by an extension part that is specific to the sample entry of the metadata track. Each sample specifies a sphere region.

One of the specific sphere region timed metadata tracks specified in OMAF is known as a recommended viewport timed metadata track, which indicates the viewport that should be displayed when the user does not have control of the viewing orientation or has released control of the viewing orientation. The recommended viewport timed metadata track may be used for indicating a recommended viewport based on a "director's cut" or based on measurements of viewing statistics. A textual description of the recommended viewport may be provided in the sample entry. The type of the recommended viewport may be indicated in the sample entry and may be a recommended viewport per the director's cut, e.g., a viewport suggested according to the creative intent of the content author or content provider.

Videos and/or images may be overlaid on an omnidirectional video and/or image. The coded overlaying video can be a separate stream or part of the bitstream of the currently rendered 360-degree video/image. An omnidirectional streaming system may overlay a video/image on top of the omnidirectional video/image being rendered. The overlaid two-dimensional video/image may have a rectangular grid or a non-rectangular grid. The overlaying process may cover the overlaid video/image or a part of the video/image or there may be some level of transparency/opacity or more than one level of transparency/opacity wherein the overlaid video/image may be seen under the overlaying video/image but with less brightness. In other words, there could be an associated level of transparency corresponding to the video/image in a foreground overlay and the video/image in the background (video/image of VR scene). The terms opacity and transparency may be used interchangeably.

The overlaid region may have one or more than one level of transparency. For example, the overlaid region may have different parts with different levels of transparency. In accordance with some embodiments, the transparency level could be defined to be within a certain range, such as from 0 to 1 so that the smaller the value the smaller is the transparency, or vice versa. Additionally, the content provider may choose to overlay a part of the same omnidirectional video over the current viewport of the user. The content provider may want to overlay the video based on the viewing condition of the user. For example, overlaying may be performed, if the user's viewport does not match the content provider's recommended viewport. In this case, the client player logic overlays the content provider's recommended viewport (as a preview window) on top of the current viewport of the user. It may also be possible to overlay the recommended viewport, if the user's current viewport does not match, such that the position of the overlaid video is based on the direction in which the user is viewing. For example, overlaying the recommended viewport to the left of the display, if the recommended viewport is to the left of the user's current viewport. It may also be possible to overlay the whole 360-degree video. Yet another example is to use the overlaying visual information as a guidance mechanism to guide the user towards the recommended viewport, for example guiding people who are hearing impaired.

There may be one or more conditions on when and how to display the visual overlay. Therefore, a rendering device may need to receive information which the rendering device may use to perform the overlaying as indicated by the signalled information.

One or more overlays may be carried in a single visual media track or a single image item. When more than one overlay is carried in a single track or image item, or when an overlay is carried with other media (e.g. background), a mapping of regions from the samples of the track or the image item to the overlay metadata may be provided, e.g. in or associated with the OverlayStruct.

When several tracks or image items are collectively carrying one or more overlays and/or the background visual media, a group of the tracks and image items may be indicated in a container file. For example, an entity group of ISOBMFF may be used for this purpose.

An overlay may fall outside the user's field of view (FOV), e.g., a viewport of a user becomes non-overlapping with the overlay. For example, as illustrated in FIGS. 1A and 1B, after a user 10 rotates during omnidirectional media content playback, the viewport 12 of the user 10 become non-overlapping with the visual overlay 14. Depending on the specific situation, it may be desirable to continue or pause the playback of the overlay when the user is not watching the overlay. For example, it may be desirable to pause a timeline of overlay playback until the overlay overlaps again with the user's viewport. It may also be desirable to continue playback of the overlay even though the overlay is outside the user's viewport. Therefore, a mechanism that supports multiple timelines of playback which in turn enables custom overlay playback/pause independent of the base content would be advantageous. Accordingly, a method, apparatus and computer program product are provided in accordance with some embodiments in order to enable multiple timeline support in playback of omnidirectional media content with overlay which in turn enables customized overlay playback behavior dependent on whether the overlay overlaps with the viewport of the user.

The ISOBMFF extension in OMAF v2 specifies, OverlaySwitchAlternativesBox, an Entity grouping with grouping_type equal to 'oval' which groups overlay tracks and image items based on if they are intended to be presented as a user-switchable alternative for another overlay in the same entity group. The syntax of OverlaySwitchAlternativesBox may be as shown below:

```
aligned(8) class OverlaySwitchAlternativesBox(version, flags)
extends EntityToGroupBox('oval', version, flags) {
  // conditionally optional
  for(i=0; i<num_entities_in_group; i++)
    unsigned int(16) ref_overlay_id[i];
}
``` ref_overlay_id[i] specifies the overlay_id from the track or image item identified by i-th entity_id that is a switchable overlay in this group. The i-th referenced track or image item may have overlay_id equal to ref_overlay_id[i] present. If each of the tracks and image items identified by the entity_id values of this entity group contains exactly one overlay, ref_layer_id[i] syntax elements may or may not be present. Otherwise, ref_layer_id[i] syntax elements may be present.

Overlay and Background Grouping is another entity grouping with grouping_type equal to 'ovbg' that specifies tracks and image items containing overlays and background visual media that are intended to be presented together.

The syntax of OverlayAndBackgroundGroupingBox may be as shown below:

```
aligned(8) class OverlayAndBackgroundGroupingBox(version, flags)
extends EntityToGroupBox('ovbg', version, flags) {
  for(i=0; i<num_entities_in_group; i++) {
    bit(6) reserved = 0;
    unsigned int(1) overlay_flag[i];
    unsigned int(1) background_flag[i];
  }
}
``` overlay_flag[i] equal to 0 specifies that the entity does not contain any overlays. overlay_flag[i] equal to 1 specifies that the entity contains one or more overlays. background_flag[i] equal to 0 specifies that the entity does not contain background visual media. background_flag[i] equal to 1 specifies that the entity contains background visual media. One or both of overlay_flag[i] and background_flag[i] may be equal to 1 for each value of i in the range of 0 to num_entities_in_group−1, inclusive.

The Matroska file format is capable of (but not limited to) storing any of video, audio, picture, or subtitle tracks in one file. Matroska file extensions include .mkv for video (with subtitles and audio), .mk3d for stereoscopic video, .mka for audio-only files, and .mks for subtitles only. Matroska may be used as a basis format for derived file formats, such as WebM.

Matroska uses Extensible Binary Meta Language (EBML) as a basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested.

A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats"). MPEG DASH and 3GP-DASH are technically close to each other and may therefore be collectively referred to as DASH. Some concepts, formats, and operations of DASH are described below as an example of a video streaming system, wherein an example embodiment may be implemented. The aspects of certain embodiments of this disclosure are not limited to DASH, but rather the description is given for one possible basis on top of which certain embodiments of the disclosure may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MPD provides the necessary information for clients to establish a dynamic adaptive streaming over HTTP. The MPD contains information describing media presentation, such as an HTTP-uniform resource locator (URL) of each Segment to make a GET Segment request.

To play the content, the DASH client may obtain the MPD by using HTTP, email, thumb drive, broadcast, or other transport methods, for example. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using HTTP GET requests, for example. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure a media presentation as follows. A media presentation consists of a sequence of one or more Periods, each Period contains one or more Groups, each Group contains one or more Adaptation Sets, each Adaptation Sets contains one or more Representations, and each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, such as by bitrate, resolution, language, codec, or the like, for example. The Segment contains a certain duration of media data, and metadata to decode and present the included media content. A Segment is identified by a URI and can typically be requested by a HTTP GET request. A Segment may be defined as a unit of data associated with an HTTP-URL and optionally a byte range that may be specified by an MPD.

The DASH MPD complies with Extensible Markup Language (XML) and is therefore specified through elements and attributes as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, such as ImportantElement, for example. Elements may be present either exactly once, or the minimum and maximum occurrence may be defined by <minOccurs> . . . <maxOccurs>. Attributes in an XML document may be identified by a lower-case first letter as well as they may be preceded by a '@'-sign, e.g. @attribute, for example. To point to a specific attribute @attribute contained in an element Element, one may write Element@attribute. If an attribute's name consists of two or more combined words, camel-casing may be used after the first word, such as @veryImportantAttribute, for example. Attributes may have assigned a status in the XML as mandatory (M), optional (O), optional with default value (OD) and conditionally mandatory (CM).

In DASH, all descriptor elements are typically structured in the same way, in that they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, e.g., the processing of one of the descriptors with an identical value for @id is sufficient. Two elements of type DescriptorType are equivalent, if the element name, the value of the @schemeIdUri and the value of the @value attribute are equivalent. If the @schemeIdUri is a URN, then equivalence may refer to lexical equivalence as defined in clause 5 of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @schemeIdUri only. Attributes and elements in extension namespaces might not be used for determining equivalence. The @id attribute may be ignored for equivalence determination.

MPEG-DASH specifies descriptors EssentialProperty and SupplementalProperty.

For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

MPEG-DASH specifies a Viewpoint element that is formatted as a property descriptor. The @schemeIdUri attribute of the Viewpoint element is used to identify the viewpoint scheme employed. Adaptation Sets containing non-equivalent Viewpoint element values contain different media content components. The Viewpoint elements may equally be applied to media content types that are not video. Adaptation Sets with equivalent Viewpoint element values are intended to be presented together. This handling should be applied equally for recognized and unrecognized @schemeIdUri values.

SRD (Spatial Relationship Description) is specified in the normative Annex H of MPEG-DASH. The SRD scheme allows Media Presentation Description authors to express spatial relationships between Spatial Objects. A Spatial Object is represented by either an Adaptation Set or a Sub-Representation. As an example, a spatial relationship may express that a video represents a spatial part of another full-frame video (e.g. a region of interest, or a tile).

The SupplementalProperty and/or EssentialProperty descriptors with @schemeIdUri equal to "urn:mpeg:dash:srd:2014" are used to provide spatial relationship information associated to the containing Spatial Object. SRD may be contained exclusively in these two MPD elements (AdaptationSet and SubRepresentation).

Sub-Representation level SRDs may be used to represent Spatial Objects in one Representation such as HEVC tiling streams. In that case, SRD descriptors may be present at Adaptation Set as well as Sub-Representation levels.

The @value of the SupplementalProperty or EssentialProperty elements using the SRD scheme is a comma separated list of values for SRD parameters. The SRD parameters source_id, object_x, object_y, object_width, and object_height are required to be present and the SRD parameters total_width, total_height, and spatial_set_id are conditionally or optionally present.

source_id is a non-negative integer in decimal representation providing the identifier for the source of the content. The source_id parameter provides a unique identifier, within the Period, for the source of the content. It implicitly defines a coordinate system associated to this source. This coordinate system uses an arbitrary origin (0; 0); the x-axis is oriented from left to right and the y-axis from top to bottom. All SRD sharing the same source_id value have the same origin and axes orientations. Spatial relationships for Spatial Objects using SRD with different source_id values are undefined.

For a given source_id value, a reference space is defined, corresponding to the rectangular region encompassing the entire source content, whose top-left corner is at the origin of the coordinate system. The total_width and total_height values in a SRD provide the size of this reference space expressed in arbitrary units. total_width is a non-negative integer in decimal representation expressing the width of the reference space in arbitrary units. total_height is a non-negative integer in decimal representation expressing the height of the reference space in arbitrary units. It is allowed that there is no Spatial Object in the MPD that covers the entire source of the content, e.g. when the entire source content is represented by two separate videos.

object_x is a non-negative integer in decimal representation expressing the horizontal position of the top-left corner of the Spatial Object in arbitrary units. object_y is a non-negative integer in decimal representation expressing the vertical position of the top-left corner of the Spatial Object in arbitrary units. object_width is a non-negative integer in decimal representation expressing the width of the Spatial Object in arbitrary units. object_height is a non-negative integer in decimal representation expressing the height of the Spatial Object in arbitrary units. The object_x and object_y parameters (respectively object_width and object_height) express 2D positions (respectively 2D sizes) of the associated Spatial Object in the coordinate system associated to the source. The values of the object_x, object_y, object_width, and object_height parameters are relative to the values of the total_width and total_height parameters, as defined above. Positions (object_x, object_y) and sizes (object_width, object_height) of SRDs sharing the same source_id value may be compared after taking into account the size of the reference space, e.g., after the object_x and object_width values are divided by the total_width value and the object_y and object_height values are divided by the total_height value of their respective descriptors. Different total_width and total_height values may be used in different descriptors to provide positions and sizes information in different units for the same reference space.

spatial_set_id is a non-negative integer in decimal representation providing an identifier for a group of Spatial Objects. When not present, the Spatial Object associated to this descriptor does not belong to any spatial set and no spatial set information is given. MPD authors can express, using the spatial_set_id parameter, that some Spatial Objects, within a given source_id, have a particular spatial relationship. For instance, an MPD author may group all Adaptation Sets corresponding to tiles at the same resolution level. Therefore, the spatial_set_id parameter may be used by the DASH client to quickly select spatially related Spatial Objects.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, e.g., any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done in such a manner that a whole Segment of media data is made available for a server. Furthermore, many client implementations use a Segment as the unit for GET requests. Thus, in typical arrangements for live services a Segment can be requested by a DASH client only when the whole duration of the Media Segment is available as well as encoded and encapsulated into a Segment. For on-demand service, different strategies of selecting Segment duration may be used.

A Segment may be further partitioned into Subsegments to enable downloading segments in multiple parts, for example. Subsegments may be required to contain complete access units. Subsegments may be indexed by a Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using a byte range HTTP request. If a relatively long Segment duration is used, then Subsegments may be used to keep the size of HTTP responses reasonable and flexible for bitrate adaptation. The indexing information of a segment may be put in the single box at the beginning of that segment or spread among many indexing boxes in the segment. Different methods of spreading are possible, such as hierarchical, daisy chain, and hybrid, for example. This technique may avoid adding a large box at the beginning of the segment and therefore may prevent a possible initial download delay.

Sub-Representations are embedded in regular Representations and are described by the SubRepresentation element. SubRepresentation elements are contained in a Representation element. The SubRepresentation element describes properties of one or several media content components that are embedded in the Representation. It may for example describe the exact properties of an embedded audio component (such as codec, sampling rate, etc., for example), an embedded sub-title (such as codec, for example) or it may describe some embedded lower quality video layer (such as some lower frame rate, or otherwise, for example). Sub-Representations and Representation share some common attributes and elements. In case the @level attribute is present in the SubRepresentation element, Sub-Representations provide the ability for accessing a lower quality version of the Representation in which they are contained. In this case, Sub-Representations for example allow extracting the audio track in a multiplexed Representation or may allow for efficient fast-forward or rewind operations if provided with a lower frame rate.

The Initialization Segment and/or the Media Segments and/or the Index Segments may provide sufficient information such that the data can be easily accessed through HTTP partial GET requests. The details on providing such information are defined by the media format in use. When ISOBMFF Segments are used: the following applies: 1) The Initialization Segment contains the Level Assignment box. 2) The Subsegment Index box ('ssix') is present for each Subsegment. 3) The attribute @level specifies the level to which the described Sub-Representation is associated in the Subsegment Index. The information in Representation, Sub-Representation and in the Level Assignment ('leva') box contains information on the assignment of media data to levels. 4) Media data should have an order such that each level provides an enhancement compared to the lower levels.

If the @level attribute is absent, then the SubRepresentation element is solely used to provide a more detailed description for media streams that are embedded in the Representation.

The ISOBMFF includes a level mechanism to specify subsets of the file. Levels follow the dependency hierarchy so that samples mapped to level n may depend on any samples of levels m, where m<=n, and do not depend on any samples of levels p, where p>n. For example, levels can be specified according to a temporal sub-layer (e.g., TemporalId of HEVC). Levels may be announced in the Level Assignment ('leva') box contained in the Movie Extends ('mvex') box. Levels cannot be specified for the initial movie. When the Level Assignment box is present, it applies to all movie fragments subsequent to the initial movie. For the context of the Level Assignment box, a fraction is defined to consist of one or more Movie Fragment boxes and the associated Media Data boxes, possibly including only an initial part of the last Media Data Box. Within a fraction, data for each level appears contiguously. Data for levels within a fraction appears in increasing order of level value. All data in a fraction is assigned to levels. The Level Assignment box provides a mapping from features, such as scalability layers or temporal sub-layers, to levels. A feature can be specified through a track, a sub-track within a track, or a sample grouping of a track. For example, the Temporal Level sample grouping may be used to indicate a mapping of the pictures to temporal levels, which are equivalent to temporal sub-layers in HEVC. That is, HEVC pictures of a certain TemporalId value may be mapped to a particular temporal level using the Temporal Level sample grouping (and the same can be repeated for all TemporalId values). The Level Assignment box can then refer to the Temporal Level sample grouping in the indicated mapping to levels.

The Subsegment Index box ('ssix') provides a mapping from levels (as specified by the Level Assignment box) to byte ranges of the indexed subsegment. In other words, this box provides a compact index for how the data in a subsegment is ordered according to levels into partial subsegments. It enables a client to easily access data for partial subsegments by downloading ranges of data in the subsegment. When the Subsegment Index box is present, each byte in the subsegment is assigned to a level. If the range is not associated with any information in the level assignment, then any level that is not included in the level assignment may be used. There is 0 or 1 Subsegment Index boxes present per each Segment Index box that indexes only leaf subsegments, e.g., that only indexes subsegments but no segment indexes. A Subsegment Index box, if any, is the next box after the associated Segment Index box. A Subsegment Index box documents the subsegment that is indicated in the immediately preceding Segment Index box. Each level may be assigned to exactly one partial subsegment, e.g., byte ranges for one level are contiguous. Levels of partial subsegments are assigned by increasing numbers within a subsegment, e.g., samples of a partial subsegment may depend on any samples of preceding partial subsegments in the same subsegment, but not the other way around. For example, each partial subsegment contains samples having an identical temporal sub-layer and partial subsegments appear in increasing temporal sub-layer order within the subsegment. When a partial subsegment is accessed in this way, the final Media Data box may be incomplete, that is, less data is accessed than the length indication of the Media Data Box indicates is present. The length of the Media Data box may need adjusting, or padding may be used. The padding_flag in the Level Assignment Box indicates whether this missing data can be replaced by zeros. If not, the sample data for samples assigned to levels that are not accessed is not present.

MPEG-DASH defines segment-container formats for both ISOBMFF and MPEG-2 Transport Streams. Other specifications may specify segment formats based on other container formats. For example, a segment format based on the Matroska container file format may be summarized as follows. When Matroska files are carried as DASH segments or the like, the association of DASH units and Matroska units may be specified as follows. A subsegment (of DASH) may be defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

A DASH Preselection defines a subset of media components of an MPD that are expected to be consumed jointly by a single decoder instance, wherein consuming may comprise decoding and rendering. The Adaptation Set that contains the main media component for a Preselection is referred to as main Adaptation Set. In addition, each Preselection may include one or multiple partial Adaptation Sets. Partial Adaptation Sets may need to be processed in combination with the main Adaptation Set. A main Adaptation Set and partial Adaptation Sets may be indicated by one of the two means: a preselection descriptor or a Preselection element.

OMAF defines MPEG-DASH elements for associating various DASH elements. A SupplementalProperty element with a @schemeIdUri attribute equal to "urn:mpeg:mpegtomaf:2018:assoc" is referred to as an association descriptor. One or more association descriptors may be present at the adaptation set level, representation level and/or preselection level. An association descriptor included inside an adaptation set/representation/preselection element indicates that the parent element of this element's descriptor (e.g., adaptation set/representation/preselection element) is associated with one or more elements in the MPD indicated by the XPath query in the omaf2:Association element and the association type signalled by omaf2:@associationKindList.

In OMAF DASH MPD, a Viewpoint element with a @schemeIdUri attribute equal to "urn:mpeg:mpegtomaf: 2018:vwpt" is referred to as a viewpoint information (VWPT) descriptor.

At most one VWPT descriptor may be present the adaptation set level and no VWPT descriptor may be present at any other level. When no Adaptation Set in the Media Presentation contains a VWPT descriptor, the Media Presentation is inferred to be contain only one viewpoint.

The @value specifies the viewpoint ID of the viewpoint. The ViewPointInfo is a Container element whose sub-elements and attributes provide information about the viewpoint. The ViewPointInfo@label attribute specifies a string that provides a human readable label for the viewpoint. The ViewPointInfo.Position attributes of this element specify the position information for the viewpoint.

Currently, there is no mechanism in MPEG-DASH to group tracks/entities, e.g., grouping the corresponding Adaptation Sets/Representation Sets based on particular characteristics or a relationship similar to the track or entity grouping in ISOBMFF.

The existing mechanisms in MPEG-DASH for declaring relationships or associations are limited in their functionality, for example, common group data needs to be repeated at all levels. Usage of an association descriptor for associating/grouping media components is specified in OMAF v2 WD3 clause 8.4.2. To use Subsets as Specified in DASH clause 5.3.8, however, the player does not receive any information on why certain Adaptation Sets (AS) are split to Subsets. Moreover, only one AS split can be announced with Subsets. Thus, Subsets would only correspond to one type of entity or track group. If multiple different types of entity or track groups are used, Subsets are insufficient. Furthermore, a Subset element is allowed to be ignored in many DASH profiles. Preselection as specified in DASH clause 5.3.11 may be considered as another option. However, Preselections are linked to the idea of merging data from several Adaptation Sets to one decoder instance. This would not be appropriate in the way entity groups are used, for example, in OMAF overlays.

Therefore, an alternative mechanism for grouping entities is needed.

Referring now to FIG. 2, the apparatus 20 of some embodiments includes, is associated with or is otherwise in communication with processing circuitry 22, a memory 24, a communication interface 26 and optionally, a user interface 28 as shown in FIG. 2. The apparatus of some embodiments may be provided by any of a wide variety of computing devices including, for example, a video encoder, a video decoder, a computer workstation, a server or the like, or by any of various mobile computing devices, such as a mobile terminal, e.g., a smartphone, a tablet computer, a video game player, etc. Alternatively, the apparatus may be embodied by a virtual reality system, such as a virtual reality headset capable of receiving one or more data streams and rendering visual and audiovisual content that can be presented to a user.

The processing circuitry 22 may be in communication with the memory device 24 via a bus for passing information among components of the apparatus 20. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with some embodiments of the present disclosure. For example, the memory device could be configured to buffer input data for processing by the processing circuitry. Additionally or alternatively, the memory device could be configured to store instructions for execution by the processing circuitry.

The apparatus 20 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement some embodiments of the present invention on a single chip or as a single "system on a chip." As such, in some cases, a chip or chipset may constitute means for performing one or more operations for providing the functionalities described herein.

The processing circuitry 22 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In some embodiments, the processing circuitry 22 may be configured to execute instructions stored in the memory device 24 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to some embodiments of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ some embodiments of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 26 may be any means such as a device or circuitry embodied in either hardware or a combination of hardware and software that is configured to receive and/or transmit data, including visual content in the form of video or image files, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 20 is configured to process the visual content in the form of video or image files and render the visual content in the form of video or image files, the apparatus 20 may optionally include a user interface 28 that may, in turn, be in communication with the processing circuitry 22 to provide output to the user, such as by rendering the visual content in the form of video or in/mage files and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 24, and/or the like).

Referring now to FIG. 3, the operations performed, such as by the apparatus 20 of FIG. 2 embodied by or otherwise associated with a source computing device are depicted. As shown in block 30, the apparatus includes means, such as the processing circuitry 22, the memory 24 or the like, for encoding a first media entity and a second media entity in a container file. The first media entity and the second entity may take the form of one or more of: one or more image items, one or more tracks, or the like.

Alternatively to block 30, a container file may be received wherein the container file comprises a first media entity and a second media entity.

As shown in block 32, the apparatus includes means, such as the processing circuitry 22, the memory 24 or the like, for encoding a first entity grouping based on a grouping type in the container file. The first entity grouping groups the first media entity and the second media entity based on a characteristic defined by the grouping type. For example, in some embodiments, grouping type 'msrc' indicates that a track belongs to a multi-source presentation and grouping type 'ovbg' specifies one or more tracks and image items containing overlays and background visual media are intended to be presented together.

Alternatively to block 32, the received container file may comprise a first entity grouping based on a grouping type.

As shown in block 34, the apparatus includes means, such as the processing circuitry 22, the memory 24 or the like, for creating a media presentation description with a first representation set and a second representation set. The first representation set belongs to a first adaptation set and the second representation set belongs to a second adaptation set. And the first representation set is associated with the first media entity and the second representation set is associated with the second media entity.

As shown in block 36, the apparatus includes means, such as the processing circuitry 22, the memory 24 or the like, for encoding, in the media presentation description, an adaptation and representation grouping descriptor. The adaptation and representation grouping descriptor groups the first representation set with the second representation set based on the grouping type.

Block 38 may be optional in the operation of the apparatus. As shown in block 38, the apparatus includes means, such as the processing circuitry 22, the memory 24 or the like, for causing storage of the container file.

In some embodiments, the adaptation and representation grouping descriptor is present at a period level. In some embodiments, the adaptation and representation grouping descriptor is present at a media presentation description level. In some embodiments, blocks 30, 32, and 38 may be performed by a file writer and blocks 34 and 36 may be performed by a media presentation description writer. In some embodiments, file writer and the media presentation description writer may be embodied by the same apparatus. In some embodiments, the file writer and the media presentation description writer may be embodied by different apparatuses.

Referring now to block 40 of FIG. 4 from the perspective of the client computing device, the apparatus 20 embodied or otherwise associated with the client computing device includes means, such as the processing circuitry 22, the memory 24 or the like, for parsing, from a media presentation description of a container file, a first representation set belonging to a first adaptation set of the container file and a second representation set belonging to a second adaptation set of the container file.

As shown in block 42, the apparatus includes means, such as the processing circuitry 22, the memory 24 or the like, for parsing, from the media presentation description, an adaptation and representation grouping descriptor. The adaptation and representation grouping descriptor groups the first representation set with the second representation set based on the grouping type.

As shown in block 44, the apparatus includes means, such as the processing circuitry 22, the memory 24 or the like, for selecting the first representation set and the second representation set.

In an embodiment, as a consequence of selecting the first representation set and the second representation set, a request for receiving (Sub)segments of the first and second representation sets is issued. The request may for example be an HTTP GET request.

Block 46 may be optional in the operation of the apparatus. As shown in block 46, the apparatus includes means, such as the processing circuitry 22, the memory 24 or the like, for parsing, from the container file, a first entity grouping. The first entity grouping groups the first media entity and the second media entity based on a characteristic defined by the grouping type.

As shown in block 48, the apparatus includes means, such as the processing circuitry 22, the memory 24 or the like, for causing the first representation set and the second representation set to be played based on the first entity grouping or the adaptation and representation grouping descriptor.

In some embodiments, the first entity grouping can be carried in an MPD with either a SupplementalProperty and/or EssentialProperty descriptor which has an association/relationship with the Adaptation Sets/Representation Sets between which grouping has been declared. In some embodiments, an adaptation and representation grouping descriptor may take the form of an EntityToGroup descriptor which may indicate the grouping of Adaptation sets/Representation Sets. An EssentialProperty or a SupplementalProperty EntityToGroup element with a @schemeIdUri attribute equal to a particular defined URN, such as "urn:mpeg:mpegI:isobmff:2019:etgb", is referred to as an EntityToGroup descriptor. In some embodiments, one or more EntityToGroup descriptors may be present at a period level or at a MPD level. In some embodiments, the @value attribute of the EntityToGroup descriptor may not be present. The EntityToGroup descriptor may include one or more EntityGroup elements with attributes as specified in the following: EntityGroup@group_type attribute indicates the type of grouping; EntityGroup@group_id attribute is a non-negative integer assigned to the grouping that may not be equal to any EntityGroup@group_id value of any other EntityGroup element; one or more EntityIdList element with two attributes EntityIdList@asid and EntityIdList@rsid lists the pair of identifiers (ids) of all the Adaptation Sets and the corresponding Representation Sets which are part of the group. In some embodiments, if the EntityToGroup descriptor is present at the MPD level then the EntityIdList element contains an additional attribute EntityIdList@pid which indicates the id of the period. The combination of EntityIdList@pid, EntityIdList@asid and EntityIdList@rsid specifies a unique entity which is part of the group.

In some embodiments, one or more EntityToGroup descriptors may be present at the adaptation set level or representation set level or preselection level and no EntityToGroup descriptors may be present at the MPD or Period level. When the EntityToGroup descriptors are present at the adaptation set level or representation set level or preselection level the pair of EntityGroup@group_id and EntityGroup@group_type identifies the unique entity group within the MPD. The adaptation set or representation set that contains a particular EntityToGroup descriptor having the same value of EntityGroup@group_id and EntityGroup@group_type belong to the same entity group.

An example EntityToGroup descriptor may include elements and attributes as specified in Table below. The "Use" column may be defined as used in the OMAF working draft.

| Elements and Attributes for EntityToGroup descriptor | Use | Description |
| --- | --- | --- |
| EntityGroup | 1 . . . N | Container element which specifies an Entity Group. Its sub-element and attributes provide information about the entity group |
| EntityGroup@group_type | M | This attribute is an integer that identifies the type (e.g., criterion used to form the Entity groups) of the Entity grouping. |
| EntityGroup@group_id | M | This attribute is a non-negative integer assigned to the entity group that may not be equal to any EntityGroup@group_id value of any other EntityGroup element. |
| EntityGroup.EntityIdList | 1 . . . N | The attributes of this element list all the Adaptation Sets and the corresponding Representation Sets which belong to this entity group |
| EntityGroup.EntityIdList@pid | M | Specifies the Period ID that belong to the entity group |
| EntityGroup.EntityIdList@asid | M | Specifies the Adaptation Set ID that belong to the entity group |
| EntityGroup.EntityIdLis@rsid | M | Specifies the Representation Set ID present in the Adaptation Set specified by the EntityGroup.EntityIdList@asid which belongs to the entity group |

An example XML schema of the EntityGroup is shown below

```
<?xml version="1.0" encoding="UTF-8"?>
<xs:schema xmlns:xs="http://www.w3.org/2001/XMLSchema"
    targetNamespace="urn:mpeg:mpegI:isobmff:2019"
    xmlns:isbf="urn:mpeg:mpegI:omaf:2019"
    elementFormDefault="qualified">
    <xs:import namespace="urn:mpeg:mpegI:isobmff:2019"
        schemaLocation="ISOBMFF.xsd"/>
    <xs:element name="EntityGroup" type="isbf:EntityGroupType"/>
    <xs:complexType name=" EntityGroupType">
        <xs:sequence>
            <xs:element name="EntityIdList" type="isbf:EntityIdType"
                minOccurs="1" maxOccurs="N"/>
        </xs:sequence>
        <xs:attribute name=" group_type" type="xs:int" use="required"/>
        <xs:attribute name=" group_id" type="xs:int" use="required"/>
        <xs:anyAttribute processContents="skip"/>
    </xs:complexType>
    <xs:complexType name="EntityIdType">
        <xs:attribute name="pid" type="xs:unsignedInt" use="required"/>
        <xs:attribute name="asid" type="xs:unsignedInt" use="required"/>
        <xs:attribute name="rsid" type="xs:unsignedInt" use="required"/>
        <xs:anyAttribute namespace="##other" processContents="lax"/>
    </xs:complexType>
</xs:schema>
```

An example EntityToGroup descriptor present at a period level of an MPD is shown below.

```xml
<?xml version="1.0" encoding="UTF-8"?>
<MPD
    xmlns:xsi="http://www.w3.org/2001/XMLSchema-instance"
    xmlns isbf="urn:mpeg:mpegI:omaf:2019"
    xsi:schemaLocation=" urn:mpeg:mpegI:isobmff:2019 ISOBMFF.xsd"
    type="static"
    mediaPresentationDuration="PT3256S"
    minBufferTime="PT1.2S"
    profiles="urn:mpeg:dash:profile:isoff-on-demand:2011">
    <Period>
        <EntityToGroup>
            <EssentialProperty schemeIdUri="urn:mpeg:mpegI:isobmff:2019:etgb"/>
                <isbf:EntityGroup group_type="msrc" group_id="1">
                    <isbf:EntityIdList asid="1" rsid="11"/>
                    <isbf:EntityIdList asid="2" rsid="21"/>
                </isbf:EntityGroup>
        </EntityToGroup>
        <!-- Sub-picture 1 -->
        <AdaptationSet id="1" segmentAlignment="true" subsegmentAlignment="true"
subsegmentStartsWithSAP="1">
            <EssentialProperty schemeIdUri="urn:mpeg:dash:srd:2014" value="0,0,0,640,640,3840,1920"/>
            <SupplementalProperty schemeIdUri="urn:mpeg:mpegI:omaf:2017:cc">
                <omaf:cc shape_type="1" view_idc_presence_flag="0" default_view_idc="0">
                    <omaf:coverageInfo
                        centre_azimuth="9830400"
                        centre_elevation="3932160"
                        azimuth_range="3932160"
                        elevation_range="3932160"
                    />
                </omaf:cc>
            </SupplementalProperty>
            <Representation id="11" mimeType='video/mp4 profiles="hevd"' codecs="resv.podv+erpv.hvc1.2.L123.B0"
width="640" height="640" bandwidth="79707" startWithSAP="1">
                <EssentialProperty schemeIdUri="urn:mpeg:mpegI:omaf:2017:pf"
                    omaf:projection_type="0"/>
                <EssentialProperty schemeIdUri="urn:mpeg:mpegI:omaf:2017:rwpk"
                    omaf:packing_type="0"/>
                <BaseURL> subpic1.mp4</BaseURL>
                <SegmentBase indexRangeExact="true" indexRange="837-988"/>
            </Representation>
        </AdaptationSet>
        <!-- Sub-picture 2 -->
        <AdaptationSet id="2" segmentAlignment="true" subsegmentAlignment="true"
subsegmentStartsWithSAP="1">
            <EssentialProperty schemeIdUri="urn:mpeg:dash:srd:2014" value="0,640,0,640,640,3840,1920"/>
            <SupplementalProperty schemeIdUri="urn:mpeg:mpegI:omaf:2017:cc">
                <omaf:cc shape_type="1" view_idc_presence_flag="0" default_view_idc="0">
                    <omaf:coverageInfo
                        centre_azimuth="5898240"
                        centre_elevation="3932160"
                        azimuth_range="3932160"
                        elevation_range="3932160"
                    />
                </omaf:cc>
            </SupplementalProperty>
            <Representation id="21" mimeType='video/mp4 profiles="hevd"'
                codecs="resv.podv+erpv.hvc1. 2.L123.B0" width="640" height="640"
                bandwidth="79707" startWithSAP="1">
                <EssentialProperty schemeIdUri="urn:mpeg:mpegI:omaf:2017:pf"
                    omaf:projection_type="0"/>
                <EssentialProperty schemeIdUri="urn:mpeg:mpegI:omaf:2017:rwpk"
                    omaf:packing_type="0"/>
                <BaseURL> subpic2.mp4</BaseURL>
                <SegmentBase indexRangeExact="true" indexRange="837-988"/>
            </Representation>
        </AdaptationSet>
    ...
    </Period>
</MPD>
```

In some embodiments, the EntityGroup@group_type is equal to 'oval' and specifies Representation Sets of the respective tracks and image items containing overlays intended to be presented as a user-switchable alternative for another overlay in the same entity group.

In some embodiments, a EntityGroup@ref_overlay_id attribute is defined under a particular defined namespace, such as "urn:mpeg:mpegI:omaf:2018", for the EntityToGroup descriptor. In an embodiment, the EntityGroup@ref_overlay_id attribute is a comma separated list which indicates each overlay_id from the Representation Set that is a switchable overlay in this group. The i-th referenced Representation Set may have an overlay_id equal to the ith item of the list in the EntityGroup@ref_overlay_id. If each Representation Set identified by the EntityIdList of this EntityGroup contains exactly one overlay, EntityGroup@ref_overlay_id attribute may or may not be present. Otherwise, EntityGroup@ref_overlay_id attribute may be present. In some embodiments, the list of overlay ID's carried by the EntityGroup@ref_overlay_id attribute is an ordered list. The ordered list may indicate the preference order in which the overlay's are switched and presented by the player.

An example EntityToGroup descriptor with EntityGroup@ref_overlay_id attribute is specified in the Table below.

| | | |
|---|---|---|
| EntityGroup@group_type | M | EntityGroup@group_type = 'oval' |
| EntityGroup@ref_overlay_id | O | This attribute is a whitespace-separated list of Overlay IDs which are user-switchable alternative for another overlay in the same list |

An example XML schema of the EntityGroup is shown below

```
<?xml version="1.0" encoding="UTF-8"?>
<xs:schema xmlns:xs="http://www.w3.org/2001/XMLSchema"
    targetNamespace=" urn:mpeg:mpegI:omaf:2018"
    xmlns:isbf=" urn:mpeg:mpegI:omaf:2018"
    elementFormDefault="qualified">
    <xs:import namespace=" urn:mpeg:mpegI:omaf:2018"
        schemaLocation="ISOBMFF.xsd"/>
    <xs:element name="EntityGroup" type="isbf:EntityGroupType"/>
    <xs:complexType name=" EntityGroupType">
        <xs:sequence>
            <xs:element name="EntityIdList" type="isbf:EntityIdType"
                minOccurs="1" maxOccurs="N"/>
        </xs:sequence>
        <xs:attribute name=" group_type" type="xs:int" use="required"/>
        <xs:attribute name=" group_id" type="xs:int" use="required"/>
        <xs:attribute name=" ref_overlay_id" type="omaf:listofUnsigned-
            Byte" use="optional"/>
        <xs:anyAttribute processContents="skip"/>
    </xs:complexType>
    <xs:complexType name="EntityIdType">
        <xs:attribute name="pid" type="xs:unsignedInt" use="required"/>
        <xs:attribute name="asid" type="xs:unsignedInt" use="required"/>
        <xs:attribute name="rsid" type="xs:unsignedInt" use="required"/>
        <xs:anyAttribute namespace="##other" processContents="lax"/>
    </xs:complexType>
</xs:schema>
```

An example EntityToGroup descriptor present at a period level of an MPD is shown below.

```
<?xml version="1.0" encoding="UTF-8"?>
<MPD
    xmlns:xsi="http://www.w3.org/2001/XMLSchema-instance"
    xmlns omaf2="urn:mpeg:mpegI:omaf:2018"
    xsi:schemaLocation="urn:mpeg:mpegI:omaf:2018 ISOBMFF.xsd"
    type="static"
    mediaPresentationDuration="PT3256S"
    minBufferTime="PT1.2S"
    profiles="urn:mpeg:dash:profile:isoff-on-demand:2011">
    <Period>
        <EntityToGroup>
            <EssentialProperty schemeIdUri="urn:mpeg:mpegI:isobmff:2019:etgb"/>
                <isbf:EntityGroup group_type="ovly" group_id="1" ref_overlay_id="101 201">
                    <isbf:EntityIdList asid="3" rsid="31"/>
                    <isbf:EntityIdList asid="4" rsid="41"/>
                </isbf:EntityGroup>
        </EntityToGroup>
        <!-- Sub-picture 1 -->
        <AdaptationSet id="1" segmentAlignment="true" subsegmentAlignment="true"
```

-continued

```
subsegmentStartsWithSAP="1">
      <EssentialProperty schemeIdUri="urn:mpeg:dash:srd:2014" value="0,0,0,640,640,3840,1920"/>
      <SupplementalProperty schemeIdUri="urn:mpeg:mpegI:omaf:2017:cc">
         <omaf:cc shape_type="1" view_idc_presence_flag="0" default_view_idc="0">
           <omaf:coverageInfo
             centre_azimuth="9830400"
             centre_elevation="3932160"
             azimuth_range="3932160"
             elevation_range="3932160"
           />
         </omaf:cc>
      </SupplementalProperty>
      <Representation id="11" mimeType='video/mp4 profiles="hevd"' codecs="resv.podv+erpv.hvc1.2.L123.B0"
width="640" height="640" bandwidth="79707" startWithSAP="1">
         <EssentialProperty schemeIdUri="urn:mpeg:mpegI:omaf:2017:pf"
             omaf:projection_type="0"/>
         <EssentialProperty schemeIdUri="urn:mpeg:mpegI:omaf:2017:rwpk"
             omaf:packing_type="0"/>
         <BaseURL> subpic1.mp4</BaseURL>
         <SegmentBase indexRangeExact="true" indexRange="837-988"/>
      </Representation>
   </AdaptationSet>
   <!-- Sub-picture 2 -->
   <AdaptationSet id="2" segmentAlignment="true" subsegmentAlignment="true"
subsegmentStartsWithSAP="1">
      <EssentialProperty schemeIdUri="urn:mpeg:dash:srd:2014" value="0,640,0,640,640,3840,1920"/>
      <SupplementalProperty schemeIdUri="urn:mpeg:mpegI:omaf:2017:cc">
         <omaf:cc shape_type="1" view_idc_presence_flag="0" default_view_idc="0">
           <omaf:coverageInfo
             centre_azimuth="5898240"
             centre_elevation="3932160"
             azimuth_range="3932160"
             elevation_range="3932160"
           />
         </omaf:cc>
      </SupplementalProperty>
      <Representation id="21" mimeType='video/mp4 profiles="hevd"'
         codecs="resv.podv+erpv.hvc1. 2.L123.B0" width="640" height="640"
         bandwidth="79707" startWithSAP="1">
         <EssentialProperty schemeIdUri="urn:mpeg:mpegI:omaf:2017:pf"
             omaf:projection_type="0"/>
         <EssentialProperty schemeIdUri="urn:mpeg:mpegI:omaf:2017:rwpk"
             omaf:packing_type="0"/>
         <BaseURL> subpic2.mp4</BaseURL>
         <SegmentBase indexRangeExact="true" indexRange="837-988"/>
      </Representation>
   </AdaptationSet>
   <!—Overlay 1 -->
   <AdaptationSet id="3" segmentAlignment="true" subsegmentAlignment="true"
subsegmentStartsWithSAP="1">
      <EssentialProperty schemeIdUri="urn:mpeg:dash:srd:2014" />
      <EssentialProperty schemeIdUri="urn:mpeg:mpegI:omaf:2018:ovly">
         <omaf:ovly value="101" priority="0" > </omaf:ovly>
      </ EssentialProperty >
      <Representation id="31" mimeType='video/mp4 profiles="hevd"'
         codecs="resv.podv+erpv.hvc1. 2.L123.B0" width="120" height="120"
         bandwidth="34353" startWithSAP="1">
         <BaseURL>ovly1.mp4</BaseURL>
      </Representation>
   </AdaptationSet>
   <!—Overlay 2 -->
   <AdaptationSet id="4" segmentAlignment="true" subsegmentAlignment="true"
subsegmentStartsWithSAP="1">
      <EssentialProperty schemeIdUri="urn:mpeg:dash:srd:2014" />
      <EssentialProperty schemeIdUri="urn:mpeg:mpegI:omaf:2018:ovly">
         <omaf:ovly value="201" priority="0" > </omaf:ovly>
      </ EssentialProperty >
      <Representation id="41" mimeType='video/mp4 profiles="hevd"'
         codecs="resv.podv+erpv.hvc1. 2.L123.B0" width="120" height="120"
         bandwidth="896798" startWithSAP="1">
         <BaseURL> ovly2.mp4</BaseURL>
      </Representation>
   </AdaptationSet>
...
   </Period>
</MPD>
```

In some embodiments, the EntityGroup@group_type is equal to 'ovbg' and specifies Representation Sets of the respective tracks and image items containing overlays and background visual media that are intended to be presented together.

In some embodiments, an EntityGroup with @group_type equal to 'ovbg' may contain either a Representation Set of a background visual media track or a Representation Set of a background image item but not both. Additionally, any two Representation Sets of the corresponding background visual media tracks or image items in the same 'ovbg' entity group may be alternatives to each other, included in the same Adaptation Set.

In some embodiments, when one or more overlays and background visual media are region-wise packed into the same Representation Set and included in an 'ovbg' entity group, the same 'ovbg' entity group may contain no other Representation Set containing background visual media.

In some embodiments, a EntityGroup.EntityIDList@overlay_flag attribute and a EntityGroup.EntityIDList@background_flag attribute are defined under the namespace "urn:mpeg:mpegI:omaf:2018" for the EntityToGroup descriptor. The EntityGroup.EntityIDList @overlay_flag attribute indicates that the Representation Set indicated in the EntityIdList contains an overlay, and if the value is zero it indicates that the Representation Set indicated in the EntityIdList does not contain an overlay. Similarly the EntityGroup.EntityIDList @background_flag attribute indicates that the Representation Set indicated in the EntityIdList contains a background, and if the value is zero, it indicates that the Representation Set indicated in the EntityIdList does not contain background.

The EntityToGroup descriptor with EntityGroup.EntityIDList@overlay_flag and EntityGroup.EntityIDList@background_flag attributes are specified in Table below.

| | | |
|---|---|---|
| EntityGroup@group_type | M | EntityGroup@group_type = 'ovbg' |
| EntityGroup.EntityIDList@overlay_flag | O | This attribute indicates if the entity specified by EntityGroup.EntityIDList@asid and EntityGroup.EntityIDList@rpid contains overlay |
| EntityGroup.EntityIDList@background_flag | O | This attribute indicates if the entity specified by EntityGroup.EntityIDList@asid and EntityGroup.EntityIDList@rpid contains background |

One example XML, schema of the EntityGroup is shown below

```
<?xml version="1.0" encoding="UTF-8"?>
<xs:schema xmlns:xs="http://www.w3.org/2001/XMLSchema"
    targetNamespace=" urn:mpeg:mpegI:omaf:2018"
    xmlns:isbf=" urn:mpeg:mpegI:omaf:2018"
    elementFormDefault="qualified">
    <xs:import namespace=" urn:mpeg:mpegI:omaf:2018"
        schemaLocation="ISOBMFF.xsd"/>
    <xs:element name="EntityGroup" type="isbf:EntityGroupType"/>
    <xs:complexType name=" EntityGroupType">
        <xs:sequence>
            <xs:element name="EntityIdList" type="isbf:EntityIdType"
                minOccurs="1" maxOccurs="N"/>
        </xs:sequence>
        <xs:attribute name=" group_type" type="xs:int" use="required"/>
        <xs:attribute name=" group_id" type="xs:int" use="required"/>
        <xs:anyAttribute processContents="skip"/>
    </xs:complexType>
    <xs:complexType name="EntityIdType">
        <xs:attribute name="pid" type="xs:unsignedInt" use="optional"/>
        <xs:attribute name="asid" type="xs:unsignedInt" use="optional"/>
        <xs:attribute name="rsid" type="xs:unsignedInt" use="required"/>
        <xs:attribute name="overlay_flag" type="xs:bool" use="optional"/>
        <xs:attribute name="background_flag" type="xs:bool"
            use="optional"/>
        <xs:anyAttribute namespace="##other" processContents="lax"/>
    </xs:complexType>
</xs:schema>
```

One example EntityToGroup descriptor present at a period level of an MPD is shown below:

```
<?xml version="1.0" encoding="UTF-8"?>
<MPD
    xmlns:xsi="http://www.w3.org/2001/XMLSchema-instance"
    xmlns omaf2="urn:mpeg:mpegI:omaf:2018"
    xsi:schemaLocation="urn:mpeg:mpegI:omaf:2018 ISOBMFF.xsd"
    type="static"
    mediaPresentationDuration="PT3256S"
    minBufferTime="PT1.2S"
```

```xml
profiles="urn:mpeg:dash:profile:isoff-on-demand:2011">
<Period>
  <EntityToGroup>
    <EssentialProperty schemeIdUri="urn:mpeg:mpegI:isobmff:2019:etgb"/>
      <isbf:EntityGroup group_type="ovly" group_id="1">
        <isbfEntityIdList asid="1" rsid="11" overlay_flag="0" background_flag="1"/>
        <isbfEntityIdList asid="3" rsid="31" overlay_flag="1" background_flag="0"/>
        <isbfEntityIdList asid="4" rsid="41" overlay_flag="1" background_flag="0"/>
      </isbf:EntityGroup>
  </EntityToGroup>
  <!-- Sub-picture 1 -->
  <AdaptationSet id="1" segmentAlignment="true" subsegmentAlignment="true" subsegmentStartsWithSAP="1">
    <EssentialProperty schemeIdUri="urn:mpeg:dash:srd:2014" value="0,0,0,640,640,3840,1920"/>
    <SupplementalProperty schemeIdUri="urn:mpeg:mpegI:omaf:2017:cc">
      <omaf:cc shape_type="1" view_idc_presence_flag="0" default_view_idc="0">
        <omaf:coverageInfo
           centre_azimuth="9830400"
           centre_elevation="3932160"
           azimuth_range="3932160"
           elevation_range="3932160"
           />
      </omaf:cc>
    <SupplementalProperty>
    <Representation id="11" mimeType='video/mp4 profiles="hevd" codecs="resv.podv+erpv.hvc1.2.L123.B0" width="640" height="640" bandwidth="79707" startWithSAP="1">
      <EssentialProperty schemeIdUri="urn:mpeg:mpegI:omaf:2017:pf"
         omaf:projection_type="0"/>
      <EssentialProperty schemeIdUri="urn:mpeg:mpegI:omaf:2017:rwpk"
         omaf:packing_type="0"/>
      <BaseURL> subpic1.mp4</BaseURL>
      <SegmentBase indexRangeExact="true" indexRange="837-988"/>
    </Representation>
  </AdaptationSet>
  <!-- Sub-picture 2 -->
  <AdaptationSet id="2" segmentAlignment="true" subsegmentAlignment="true" subsegmentStartsWithSAP="1">
    <EssentialProperty schemeIdUri="urn:mpeg:dash:srd:2014" value="0,640,0,640,640,3840,1920"/>
    <SupplementalProperty schemeIdUri="urn:mpeg:mpegI:omaf:2017:cc">
      <omaf:cc shape_type="1" view_idc_presence_flag="0" default_view_idc="0">
        <omaf:coverageInfo
           centre_azimuth="5898240"
           centre_elevation="3932160"
           azimuth_range="3932160"
           elevation_range="3932160"
           />
      </omaf:cc>
    </SupplementalProperty>
    <Representation id="21" mimeType='video/mp4 profiles="hevd"'
       codecs="resv.podv+erpv.hvc1. 2.L123.B0" width="640" height="640"
       bandwidth="79707" startWithSAP="1">
      <EssentialProperty schemeIdUri="urn:mpeg:mpegI:omaf:2017:pf"
         omaf:projection_type="0"/>
      <EssentialProperty schemeIdUri="urn:mpeg:mpegI:omaf:2017:rwpk"
         omaf:packing_type="0"/>
      <BaseURL> subpic2.mp4</BaseURL>
      <SegmentBase indexRangeExact="true" indexRange="837-988"/>
    </Representation>
  </AdaptationSet>
  <!--Overlay 1 -->
  <AdaptationSet id="3" segmentAlignment="true" subsegmentAlignment="true" subsegmentStartsWithSAP="1">
    <EssentialProperty schemeIdUri="urn:mpeg:dash:srd:2014" />
    <EssentialProperty schemeIdUri="urn:mpeg:mpegI:omaf:2018:ovly">
      <omaf:ovly value="101" priority="0" > </omaf:ovly>
    </ EssentialProperty >
    <Representation id="31" mimeType='video/mp4 profiles="hevd"'
       codecs="resv.podv+erpv.hvc1. 2.L123.B0" width="120" height="120"
       bandwidth="34353" startWithSAP="1">
      <BaseURL>ovly1.mp4</BaseURL>
    </Representation>
  </AdaptationSet>
  <!--Overlay 2 -->
  <AdaptationSet id="4" segmentAlignment="true" subsegmentAlignment="true" subsegmentStartsWithSAP="1">
    <EssentialProperty schemeIdUri="urn:mpeg:dash:srd:2014" />
    <EssentialProperty schemeIdUri="urn:mpeg:mpegI:omaf:2018:ovly" >
      <omaf:ovly value="201" priority="0" > </omaf:ovly>
    </ EssentialProperty >
    <Representation id="41" mimeType='video/mp4 profiles="hevd"'
       codecs="resv.podv+erpv.hvc1. 2.L123.B0" width="120" height="120"
       bandwidth="896798" startWithSAP="1">
      <BaseURL> ovly2.mp4</BaseURL>
```

```
    </Representation>
  </AdaptationSet>
...
  </Period>
</MPD>
```

In some embodiments, the entity grouping can be carried in an MPD with association descriptor of OMAF. When an Adaptation Set containing an overlay is associated with one or more Adaptation Sets containing another overlay media intended to be presented as a user-switchable alternative, an association descriptor shall be present as a child element under each of the AdaptationSet element containing the overlays. In this case the association descriptor shall include both of the following:

An XPath string in the Association element which evaluates to one or more AdaptationSet element(s) containing user-switchable alternative overlay media.

Only one 'oval' value for Association@associationKindList attribute of the Association element. In this case:

When Association@associationKindList includes one 'oval' value and the number of element(s) the XPath string in the Association element above evaluates to is greater than 1, the overlay applies collectively to the user-switchable alternative overlay media (e.g. if the user-switchable alternative overlay media is signalled via multiple Adaptation Sets with each Adaptation Set corresponding to a sub-picture).

When Association@associationKindList includes one 'oval' value and the number of elements the XPath string in the Association element above evaluates to is equal to 1, the overlay applies individually to the user-switchable alternative overlay media.

There can be multiple such association descriptors present inside an Adaptation Set containing an overlay.

While described above in conjunction with some embodiments utilizing MPEG OMAF and ISOBMFF, the method, apparatus 20 and computer program product of other example embodiments need not utilize MPEG OMAF and ISOBMFF and may, instead, utilize other formats. Further, while the method, apparatus and computer program product are provided above in conjunction with a client-server architecture, the method, apparatus and computer program product of other example embodiments may be supported by other types of architectures including point-to-point conversational architectures, point-to-multipoint (multicast or broadcast) architectures, peer-to-peer architectures or the like.

As described above, FIGS. 3 and 4 are flowcharts of an apparatus 20, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 24 of an apparatus employing some embodiments of the present invention and executed by processing circuitry 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 3 and 4. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodi- That which is claimed is:

1. A method comprising:
creating a media presentation description with a first representation and a second representation, wherein the first representation belongs to a first adaptation set and the second representation belongs to a second adaptation set, and wherein the first representation is associated with a first media entity and the second representation is associated with a second media entity; and
encoding, in the media presentation description, an adaptation and representation grouping descriptor, wherein the adaptation and representation grouping descriptor groups the first representation with the second representation based on a grouping type used to form a first entity grouping in a container file, wherein the first entity grouping is configured to group the first media entity and the second media entity based on a presentation characteristic, defined with the grouping type, that is configured to enable a plurality of media entities to be presented together, wherein the presentation characteristic defined with the grouping type is configured to indicate that the first entity grouping comprises at least two user-switchable overlays, wherein the at least two user-switchable overlays comprise at least two media entities configured to overlay an other media entity for concurrent rendering with the other media entity, wherein the at least two user-switchable overlays are configured to be switched between, to overlay the other media entity for concurrent rendering, based, at least partially, on a viewport of a user.

2. A method according to claim 1 further comprising:
causing parsing of the first media entity and the second media entity from the container file; and
causing parsing of the first entity grouping based on the grouping type from the container file.

3. A method according to claim 1, wherein the adaptation and representation grouping descriptor is present at a period level.

4. A method according to claim 1, wherein the adaptation and representation grouping descriptor is present at a media presentation description level.

5. The method of claim 1, wherein a further characteristic defined with the grouping type is configured to indicate a prioritized list of the at least two user-switchable overlays.

6. The method of claim 1, wherein the container file is according to an ISO base media file format.

7. A method comprising:
parsing, from a media presentation description of a container file, a first representation belonging to a first adaptation set of the container file and a second representation belonging to a second adaptation set of the container file;
parsing, from the media presentation description, an adaptation and representation grouping descriptor, wherein the adaptation and representation grouping descriptor groups the first representation with the second representation based on a grouping type, wherein the first representation is associated with a first media entity and the second representation is associated with a second media entity, wherein the grouping type is an indicated grouping type used to form a first entity grouping of the container file, wherein the first entity grouping is configured to group the first media entity and the second media entity based on a presentation characteristic, defined with the grouping type, that is configured to enable a plurality of media entities to be presented together, wherein the presentation characteristic defined with the grouping type is configured to indicate that the first entity grouping comprises at least two user-switchable overlays, wherein the at least two user-switchable overlays comprise at least two media entities configured to overlay an other media entity for concurrent rendering with the other media entity, wherein the at least two user-switchable overlays are configured to be switched between, to overlay the other media entity for concurrent rendering, based, at least partially, on a viewport of a user;
selecting the first representation and the second representation; and
causing the first representation and the second representation to be played based on the first entity grouping or the adaptation and representation grouping descriptor.

8. The method of claim 7, wherein a further characteristic defined with the grouping type is configured to indicate a prioritized list of the at least two user-switchable overlays.

9. An apparatus comprising
at least one processor and
at least one non-transitory memory including computer program code, the at least one memory and the computer program code configured to, with the at least one processor, cause the apparatus to:
create a media presentation description with a first representation and a second representation, wherein the first representation belongs to a first adaptation set and the second representation belongs to a second adaptation set, and wherein the first representation is associated with a first media entity and the second representation is associated with a second media entity; and
encode, in the media presentation description, an adaptation and representation grouping descriptor, wherein the adaptation and representation grouping descriptor groups the first representation with the second representation based on a grouping type used to form a first entity grouping in a container file, wherein the first entity grouping is configured to group the first media entity and the second media entity based on a presentation characteristic, defined with the grouping type, that is configured to enable a plurality of media entities to be presented together, wherein the presentation characteristic defined with the grouping type is configured to indicate that the first entity grouping comprises at least two user-switchable overlays, wherein the at least two user-switchable overlays comprise at least two media entities configured to overlay an other media entity for concurrent rendering with the other media entity, wherein the at least two user-switchable overlays are configured to be switched between, to overlay the other media entity for concurrent rendering, based, at least partially, on a viewport of a user.

10. An apparatus according to claim 9, wherein the at least one memory and the computer program code are further configured to, with the at least one processor, further cause the apparatus to:
- trigger parsing of the first media entity and the second media entity from the container file; and
- trigger parsing of the first entity grouping based on the grouping type from the container file.

11. An apparatus according to claim 9, wherein the adaptation and representation grouping descriptor is present at a period level.

12. An apparatus according to claim 9, wherein the adaptation and representation grouping descriptor is present at a media presentation description level.

13. The apparatus of claim 9, wherein a further characteristic defined with the grouping type is configured to indicate a prioritized list of the at least two user-switchable overlays.

14. The apparatus of claim 9, wherein the at least one memory and the computer program code are further configured to, with the at least one processor, further cause the apparatus to:
- encode, in the media presentation description, the grouping type.

15. The apparatus of claim 9, wherein the first representation comprises, at least, the at least two user-switchable overlays, wherein the second representation comprises, at least, the other media entity, wherein the other media entity comprise background visual media.

16. An apparatus comprising
- at least one processor and
- at least one non-transitory memory including computer program code, the at least one memory and the computer program code configured to, with the at least one processor, cause the apparatus to:
  - parse, from a media presentation description of a container file, a first representation belonging to a first adaptation set of the container file and a second representation belonging to a second adaptation set of the container file;
  - parse, from the media presentation description, an adaptation and representation grouping descriptor, wherein the adaptation and representation grouping descriptor groups the first representation with the second representation based on a grouping type, wherein the first representation is associated with a first media entity and the second representation is associated a second media entity, wherein the grouping type is an indicated grouping type used to form a first entity grouping of the container file, wherein the first entity grouping is configured to group the first media entity and the second media entity based on a presentation characteristic, defined with the grouping type, that is configured to enable a plurality of media entities to be presented together, wherein the presentation characteristic defined with the grouping type is configured to indicate that the first entity grouping comprises at least two user-switchable overlays, wherein the at least two user-switchable overlays comprise at least two media entities configured to overlay an other media entity for concurrent rendering with the other media entity, wherein the at least two user-switchable overlays are configured to be switched between, to overlay the other media entity for concurrent rendering, based, at least partially, on a viewport of a user;
  - select the first representation and the second representation; and
  - trigger the first representation and the second representation to be played based on the first entity grouping or the adaptation and representation grouping descriptor.

17. The apparatus of claim 16, wherein the at least one memory and the computer program code are further configured to, with the at least one processor, further cause the apparatus to:
- parse, from the media presentation description, the grouping type.

18. The apparatus of claim 16, wherein the first representation comprises, at least, the at least two user-switchable overlays, wherein the second representation comprises, at least, the other media entity, wherein the other media entity comprise background visual media.

19. The apparatus of claim 16, wherein a further characteristic defined with the grouping type is configured to indicate a prioritized list of the at least two user-switchable overlays.

* * * * *